US012524997B1

(12) United States Patent
Tavanaei et al.

(10) Patent No.: US 12,524,997 B1
(45) Date of Patent: Jan. 13, 2026

(54) SYSTEMS AND METHODS FOR PRODUCT DATA INCONSISTENCY DETECTION

(71) Applicant: Amazon Technologies, Inc., Seattle, WA (US)

(72) Inventors: Amirhossein Tavanaei, Mason, OH (US); Karim Bouyarmane, Seattle, WA (US); Ismail Baha Tutar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 615 days.

(21) Appl. No.: 17/663,789

(22) Filed: May 17, 2022

(51) Int. Cl.
    *G06V 10/77*  (2022.01)
    *G06Q 30/0601* (2023.01)
    *G06V 10/82*  (2022.01)

(52) U.S. Cl.
    CPC ......... *G06V 10/77* (2022.01); *G06Q 30/0603* (2013.01); *G06V 10/82* (2022.01)

(58) Field of Classification Search
    CPC .... G06Q 30/06; G06Q 30/0601; G06Q 30/00; G06Q 30/0629; G06Q 30/0641; G06Q 10/087; G06Q 30/0185; G06Q 30/0627; G06Q 30/0603; G06F 16/252; G06F 16/972; G06F 8/20; G06N 20/00; G06N 3/08; G06N 5/04; G06T 2207/20081; G06T 7/73; G06T 2207/20084; G06V 10/77; G06V 10/82
    See application file for complete search history.

(56) References Cited

U.S. PATENT DOCUMENTS

| | | | |
|---|---|---|---|
| 10,949,907 B1 * | 3/2021 | Jain | G06V 10/806 |
| 2017/0124618 A1 * | 5/2017 | Roeseler | G06Q 30/0623 |
| 2020/0089808 A1 * | 3/2020 | Liu | G06F 18/213 |
| 2020/0372350 A1 * | 11/2020 | Cho | G06N 3/045 |

FOREIGN PATENT DOCUMENTS

CN          114202038 A   *   3/2022

OTHER PUBLICATIONS

CN-114202038-A: English Translation (Year: 2022).*

* cited by examiner

*Primary Examiner* — Sumati Lefkowitz
*Assistant Examiner* — Aaron Joseph Sorrin
(74) *Attorney, Agent, or Firm* — Knobbe, Martens, Olson & Bear, LLP

(57) ABSTRACT

Systems and methods for product data inconsistency detection are provided. For instance, a method may include: retrieve a set of product listing datasets based on a product identification, wherein the product listing datasets include one or more product listings, and wherein each product listing includes at least one image and at least one text segment; compare new product data including at least one new image or at least one text segment, the at least one image, and the at least one text segment to determine whether any are inconsistent; transmit a result message to the client device, wherein the result message indicates the at least one new image or the at least one text segment is inconsistent.

17 Claims, 13 Drawing Sheets

SYSTEMS AND METHODS FOR PRODUCT DATA INCONSISTENCY DETECTION

BACKGROUND

E-commerce catalogs may contain thousands or millions of product listings for different retailers (e.g., an e-commerce website and third-party retailers on the e-commerce website). The catalog may be available across different marketplaces (e.g., countries). Generally, there may be one or more retailers for a same product (e.g., a same brand, product, color, etc.). Each retailer may have a product listing webpage or application user interface (generally, product listing) for each product. The product listing may include various pieces of product data to inform a user (e.g., a customer). The product data may include text (e.g., titles, description, technical details, reviews, and the like) describing the product and/or images of the product. Users may rely on text or images to determine whether a product is an appropriate product to buy.

In some cases, a product may be listed across the different marketplaces in association with a product identification. In this case, a same product (offered by a same or different retailer) may have different product listings in each marketplace for a same product. Again, each of these product listings may have product data to inform a user about the product.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
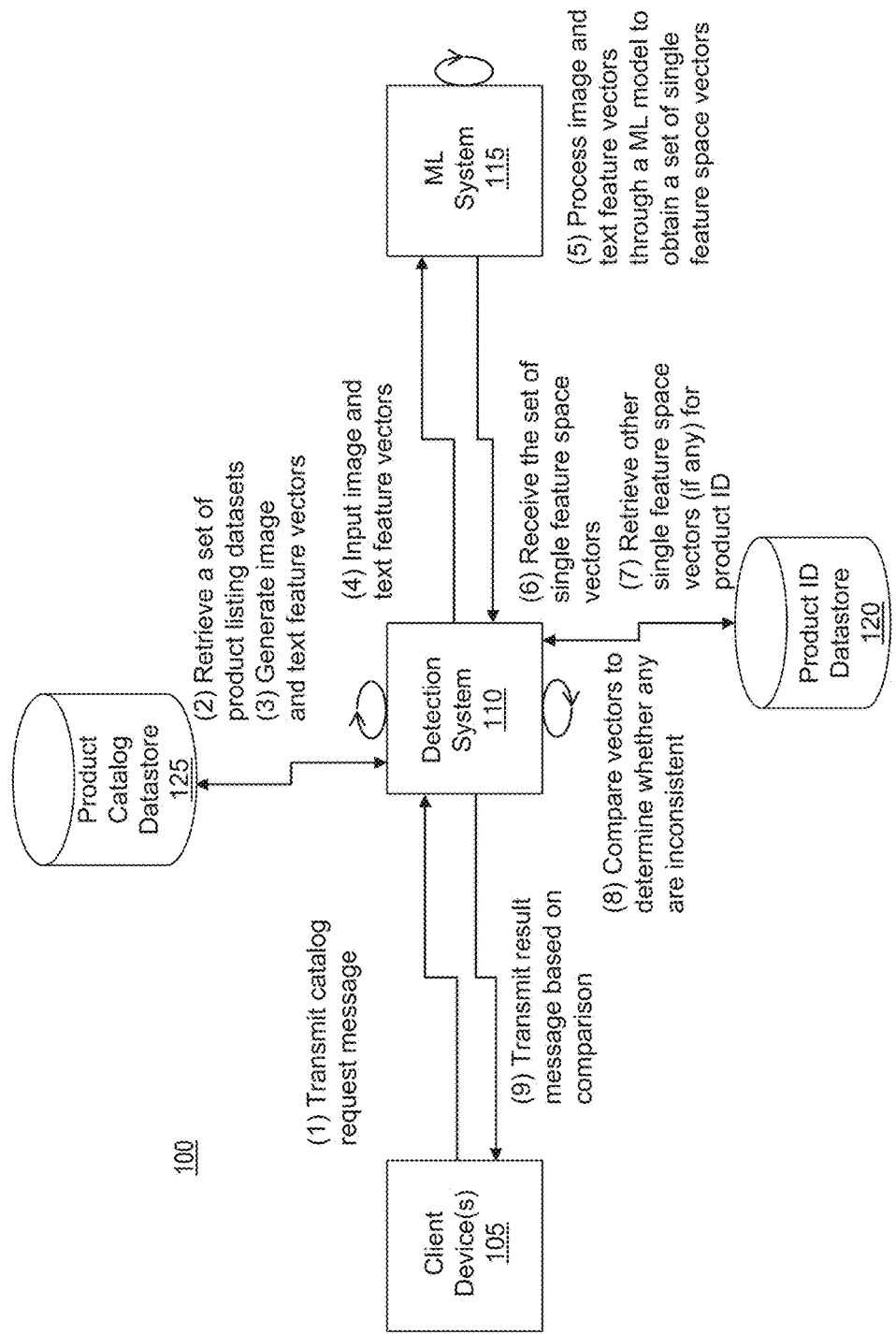
FIG. 1 is a block diagram depicting an illustrative environment in which a detection system can provide product data inconsistency detection for a catalog of product data.

Generally, aspects of the present disclosure relate to product data inconsistency detection by a detection system 110. In some cases a product may be listed across different marketplaces in association with a product ID such that a same product (offered by a same or different retailer) may have different product listings in each marketplace. In some cases, however, product data may not be consistent for a product listing or across marketplaces. For instance, product data may be mistakenly uploaded by a retailer, intentionally misrepresented by a retailer, or a product ID may have been discontinued in a certain marketplace and reused in a different marketplace (thus, potentially representing a different product). To detect these inconsistencies (either already existing in a catalog or as new product listings are added), the systems and methods of the present disclosure may compare images and/or text of product data to confirm that each represent a same product in their respective different modalities. Thus, users (e.g., customers) may experience a more reliable and easier search in finding a product; and users (e.g., retailers on e-commerce website) may reduce errors and confusion by detecting human errors and asking for better/correct images and text.

In some cases, the detection system 110 may compare new image(s) and new text (for a new product listing) to determine whether the new image(s) and new text are consistent with each other, and compare the new image(s) and new text to existing product data in a catalog of product data for a same product ID to determine whether the new image(s) and new text are consistent with the existing product data in the catalog. In some cases, the detection system 110 may determine the new image(s) and new text are consistent with each other and the existing product data for the same product ID and proceed to add the new product listing. In this case, the detection system 110 may then transmit a result message based on the comparison indicating that the new image(s) and new text are consistent. In some cases, the detection system 110 may determine that the new image(s) or new text are not consistent with each other or the existing product data for the same product ID. In this case, the detection system 110 may then transmit the result message based on the comparison indicating that the new image(s) and new text are not consistent. Thus, for new product listings, the detection system 110 may reduce mistaken data entry or malicious activity by comparing the product data of the new listing to existing product data and itself.

In some cases, the detection system 110 may compare existing product data to check whether the existing product data is consistent (e.g., within a product listing and across marketplaces with different product listings for a same product ID). In this case, the detection system 110 may compare images and text for each product listing associated with a product ID (e.g., between all or subsets of marketplaces). In response to determining the images and text are consistent, the detection system 110 may compare new product listings against the confirmed consistent product IDs (as discussed above), thus generating a system of consistent product data for products. In response to determining the images and text are not consistent, the detection system 110 may flag inconsistent pieces of data (e.g., particular images or text) as inconsistent. The flagged inconsistent pieces of data may initiate certain actions, such as requesting an owner of the product listing to correct/update the data, or delisting the product listing until the inconsistency is correct, and the like. In some cases, when the images and text are inconsistent across a set, but consistent within a subset, the detection system 110 may flag the product data of the product ID to confirm whether a new product ID should be generated for the consistent subset separate from a remainder of the set.

In some cases, to determine whether a set of images and/or text (e.g., image-image consistency, text-text consistency, image-text consistency, or larger sets of images and/or texts) are consistent, the detection system 110 may process the image and/or text (as the case may be) through a machine learning (ML) model to generate feature vectors in a single shared feature space that is not specific to either images or text. The detection system 110 may then compare the feature vectors in the single feature space using, e.g., a distance metric, such as a cosine similarity score. For instance, the ML model may be a language-agnostic (e.g., independent of English, Spanish, Portuguese, and the like) and modality-agnostic (e.g., independent of text or image) neural network representing images and text of products in a single feature space to compare the text and images regardless of their languages and modalities.

Moreover, kernels of the ML model may extract textual and visual features of the product data without pairing modalities. For instance, the kernels of the ML model may process product data in linear time without modality fusion (neither early-fusion nor late-fusion/concatenation-classification), which would process at polynomial time (due to pair-wise processing). Modality fusion generally refers to paired feature vectors being processed together to determine, e.g., whether the paired feature vectors are consistent. For instance, in the case of images and text, a text segment and image may be processed through a ML model and data representing features of the text and data representing features of the image may be embedded together or concatenated together as a part of a process to determine whether the image and text are consistent. In this case, avoiding modality fusion may significantly reduce computations required for inconsistency detection while increasing flexibility in multimodal environments. As an example, if each image or text was pairwise matched to each other image or text (as in a fusion model), a number of comparisons through the ML model may be a number of product data pieces squared (i.e., raised to the second power). This may be prohibitively computationally costly for a catalog of millions of product listings, where each product listing may include one or more images and one or more text segments (e.g., title, description, and the like).

In some cases, the ML model may be trained on a training dataset that leverages triplet loss. The systems and methods of the present disclosure may generate the training dataset by synthetically generating negative examples from known consistent data. For instance, the detection system 110 may select a title from a product category different than a positive example (e.g., a title) and anchor example (e.g., an image). The positive example and anchor example may be known to be consistent. The detection system 110 may then process the negative example, the positive example, and the anchor example through the untrained adaptive kernels to obtain single feature space vectors. The detection system 110 may determine a triplet loss (e.g., from a triplet loss objective function) based on the single feature space vectors, so that the anchor and positive vectors are closer together and the anchor and negative vectors are further away from each other. In this manner, the ML model may train the kernels to represent images and text in a same feature space. In some cases, the detection system 110 may swap anchor and positive vectors to increase training difficulty and avoid biases in training data and biases in modality.

In some cases, in inference, the detection system 110 may determine single feature space vectors for images and/or text and compare the single feature space vectors to determine whether the images and/or text are consistent. For instance, the detection system 110 may determine pairwise cosine similarity scores for each pair of single feature space vectors in a set. In some cases, the detection system 110 may determine a pairwise cosine similarity score indicates an inconsistent image or text if the cosine similarity score is less than a score threshold. In some cases, the detection system 110 may perform clustering or abnormality detection for sets of vectors.

As will be appreciated by one of skill in the art in light of the present disclosure, the embodiments disclosed herein improve the ability of computing systems, such as cloud-hosted computing systems, to detect inconsistent product data in a language-agnostic and modality-agnostic manner. Moreover, the presently disclosed embodiments address technical problems inherent within computing systems; specifically, the difficulties in computing millions, billions, or trillions of comparisons. For instance, the kernels of the ML model may operate independently, so that product data may be processed in linear time instead of polynomial time. These technical problems are addressed by the various technical solutions described herein, including a cloud-hosted computing system configured to detect inconsistent product data. Thus, the present disclosure represents an improvement on computing systems in general.

The foregoing aspects and many of the attendant advantages of this disclosure will become more readily appreciated as the same become better understood by reference to the following description, when taken in conjunction with the accompanying drawings.

FIG. 1 is a block diagram depicting an illustrative environment 100 in which a detection system 110 can provide product data inconsistency detection for a catalog of product data. The environment 100 may include client device(s) 105, the detection system 110, a machine learning (ML) system 115, a product identification (ID) datastore 120, and a product catalog datastore 125. In some embodiments, the client device(s) 105, the ML system 115, the product ID datastore 120, the product catalog datastore 125, the detection system 110, or a subset thereof are implemented on the same computing device. In some embodiments, the client device(s) 105, the ML system 115, the product ID datastore 120, the product catalog datastore 125, the detection system 110, or a subset thereof are in communication with each other via a network.

In some embodiments, the detection system 110, the ML system 115, the product ID datastore 120, and the product catalog datastore 125 are associated with an e-commerce system, such as a website. The e-commerce website may offer a plurality of products (e.g., millions) in various marketplaces (e.g., countries). The e-commerce website may (via a mobile application or desktop browser application on the client device(s) 105 of consumers) offer products directly to consumers or offer products to consumers on behalf of third-party retailers. As discussed herein, the product catalog datastore 125 may store data associated with the plurality of products, such as, but not limited to, titles of products, image(s) of products, descriptions of products, technical details of products, reviews of products, and the like (generally, referred to as "product data"). The e-commerce website may provide webpages or application user interfaces for each product derived from product data associated with each product.

The client device(s) 105 (hereinafter referred to as "client device 105" for ease of reference) can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The detection system 110 may provide the client device 105 with one or more user interfaces, command-line interfaces (CLI), application programing interfaces (API), and/or other programmatic interfaces for product data inconsistency detection. Although one or more embodiments may be described herein as using a user interface, it should be appreciated that such embodiments may, additionally or alternatively, use any CLIs, APIs, or other programmatic interfaces.

In some embodiments, the client device 105 is a client device associated with an administrator or a third-party retailer (referred to as "users") associated with the e-commerce website. In the case of administrator, the client device 105 may be associated with an employee account that has access to manage product data in product catalog datastore 125. For instance, the administrator may be an employee of the e-commerce website to manage product data and determine whether product data is consistent and, if not, initiate processes to correct the product data or remove the product data (e.g., remove a product listing). As an example, the detection system 110 (either automictically or in response to a user input by the administrator) may transmit a message to a product retailer to update product data associated with a product if the product data for the product is inconsistent. As discussed herein, the client device 105 associated with the administrator may have authorization to transmit catalog request messages to the detection system 110 to determine whether product data is consistent.

In the case of a third-party retailer, the client device 105 may be associated with a third-party retailer account that manages product data listed on the e-commerce website. The client device 105 may receive messages to update product data associated with a product if the product data for the product is inconsistent and the client device 105 may have user interfaces for the third-party retailer to provide such corrections. Moreover, the client device 105 associated with the third-party retailer may have authorization to transmit new product listing messages to the detection system 110, as a part of a process to add a new product for offer on the e-commerce website. In this case, detection system 110 may determine whether product data is consistent with itself and existing product data, as discussed herein.

The detection system 110 and the ML system 115 may be combined or separate. As shown in FIG. 1, the detection system 110 and the ML system 115 are separate to clarify the operations of each, but the respective functions may be differently arranged (e.g., combined). The detection system 110 and the ML system 115 may be hosted in a computing device, a server system, a cloud-hosted computing system, or the like. The detection system 110 and the ML system 115 may be hosted on the same or separate physical computing devices or same or separate virtual machines, etc. to process requests for product inconsistency detection.

The product ID datastore 120 and the product catalog datastore 125 may be combined or separate. As shown in FIG. 1, the product ID datastore 120 and the product catalog datastore 125 are separate to clarify the storage operations of each, but the respective storage operations may be differently arranged (e.g., combined). The product ID datastore 120 and the product catalog datastore 125 may be hosted in a computing device, a server system, a cloud-hosted computing systems, or the like. The product ID datastore 120 and the product catalog datastore 125 may be hosted on the same or separate physical computing devices or same or separate virtual machines, etc. to receive, store, update, and transmit their respective data.

In some embodiments, the product ID datastore 120 may store single feature space vectors for product data. As discussed herein, single feature space vectors may correspond to image(s) or text of product data and have data that corresponds to features of the image(s) or text that is in a shared feature space that is modality agnostic, such that similarity between an image and image, image and text, text and text may be determined. Thus, the single feature space vectors may also be referred to as shared feature space vectors or modality-agnostic feature space vectors. As also discussed herein, single feature space vectors may correspond to image(s) or text of product data and have data that corresponds to features of the image(s) or text that is in a shared feature space that is language agnostic in addition to be modality-agnostic, such that similarity between an image and image, image and text in a first language, image and text in a second language, two or more texts in a same language, two or more texts items in different languages, etc. may be determined. Thus, the single feature space vectors may also be referred to as language-agnostic feature space vectors, or as modality-agnostic and language-agnostic feature space vectors.

The product ID datastore 120 may store the single feature space vectors for the product data in a data structure, such a relational or nonrelational database, a data lake, and the like. The product ID datastore 120 may store each single feature space vector in association with a particular set of data of the product data. For instance, the product ID datastore 120 may store the single feature space vectors in a table, such as Table 1.

TABLE 1

Example product ID datastore 120:

| Product ID | Product Data ID | Single Feature Space Vector |
|---|---|---|
| Product ID_1 | Product data ID_1 | [x1, y1, z1, . . . n1] |
| Product ID_1 | Product data ID_2 | [x2, y2, z2, . . . n2] |
| Product ID_1 | Product data ID_3 | [x3, y3, z3, . . . n3] |
| . . . | . . . | . . . |
| Product ID_N | Product data ID_N | [xN, yN, zN, . . . nN] |

Product ID may refer to a particular product. For instance, the product ID may refer to a unique product (e.g., brand, item, style, and the like) in both the product ID datastore 120 and the product catalog datastore 125. The product data ID may refer to a particular piece of data, such as an image or text string. As an example, product data ID_1 may indicate a title (e.g., be a text string of a title, or a pointer to a separate data store where the text string is located), while product ID_2 may indicate a main product image (e.g., an image file, or a pointer to a separate data store where the image file is located) and product ID_3 may indicate a secondary product image (e.g., an image file, or a pointer to a separate data store where the image file is located). The single feature space vector may store the data of the single feature space vector as a list, but other formats may be used.

In some embodiments, the product ID datastore 120 may store single feature space vectors for product data that have been processed by the detection system 110, in response to catalog request messages and/or new product listing messages. In this manner, computations may be reduced by avoiding duplication of processing the product data. There may be tradeoffs in storing such feature space vectors, such as storage requirements, versus computations to re-determine the single feature space vectors if they are not stored. For instance, in the case single feature space vectors are not stored (or only for a set period of time), the single feature space vectors may be re-determined at run-time. Thus, the product ID datastore 120 should not be considered required or otherwise limiting.

As discussed above, the product catalog datastore 125 may store the product data. In some cases, the product catalog datastore 125 may be indexed (or keyed) with product ID and (optionally) marketplace ID. For instance, the product catalog datastore 125 may store additional data beyond the product data discussed herein, such as retailer ID, webpage uniform resource locator, and the like. However, for ease of reference, discussion relevant to the disclosure is explained herein. The product catalog datastore 125 may store the product data in a data structure, such a relational or nonrelational database, a data lake, and the like. The product catalog datastore 125 may store each set of product data in association with a particular product ID. For instance, the product catalog datastore 125 may store the product data in a table, such as Table 2.

TABLE 2

Example product catalog datastore 125:

| Product ID | Marketplace ID | Owner | ... | Product Data ID |
|---|---|---|---|---|
| Product ID_1 | Marketplace_1 | Owner_1 | ... | Product data ID_1 |
| Product ID_1 | Marketplace_1 | Owner_1 | ... | Product data ID_2 |
| Product ID_1 | Marketplace_1 | Owner_1 | ... | Product data ID_3 |
| ... | ... | ... | | ... |
| Product ID_1 | Marketplace_1 | Owner_2 | ... | Product data ID_4 |
| Product ID_1 | Marketplace_1 | Owner_2 | ... | Product data ID_5 |
| Product ID_1 | Marketplace_1 | Owner_2 | ... | Product data ID_6 |
| ... | ... | ... | | ... |
| Product ID_1 | Marketplace_2 | Owner_3 | ... | Product data ID_7 |
| Product ID_1 | Marketplace_2 | Owner_3 | ... | Product data ID_8 |
| Product ID_1 | Marketplace_2 | Owner_3 | ... | Product data ID_9 |
| ... | ... | ... | | ... |
| Product ID_N | Marketplace_N | Owner_N | ... | Product data ID_N |

Product ID and product data ID may be the same as discussed above. Marketplace ID may refer to different locations in which the e-commerce website offers products. For instance, marketplace_1 may indicate the United States and marketplace_2 may indicate Brazil, and the like. In some embodiments, a particular marketplace may be multilingual such that it includes multiple languages. The combination of a marketplace ID and language ID (not shown) may define a "locale" (e.g., one locale for Canada as the marketplace and English as the language, and another locale for Canada as the marketplace and French as the language, with both locales sharing a marketplace ID for Canada). In some embodiments, each marketplace may include only one language, and therefore a separate marketplace ID is used for each combination of market and language (e.g., one marketplace ID for Canada and English, and a different marketplace ID for Canada and French).

Owner may indicate a particular retailer (e.g., the e-commerce website or a particular third-party retailer) offering a product and is associated with the particular product data ID for the product ID. Generally, Table 2 may be refactored into different arrangements, such as one or more tables or a single data in a different format. For instance, each product ID may have only one row that associates marketplaces, owners, etc. across columns of each row. Moreover, the product data associated with a single owner for a product ID may be aggregated (e.g., in a data structure such as a list or index) instead of separated into different rows.

The detection system 110 may receive various requests (such as catalog request messages and/or new product listing messages), generate a set of image and/or text feature vectors to be used by the ML system 115, receive a set of single feature space vectors from the ML system 115, and compare the set of single feature space vectors to determine whether any are inconsistent, as discussed in detail herein. The ML system 115 may host a ML model that have been trained to generate the set of single feature space vectors that are in the shared feature space, as discussed herein.

The network may include any wired network, wireless network, or combination thereof. For example, the network may be a personal area network, local area network, wide area network, over-the-air broadcast network (e.g., for radio or television), cable network, satellite network, cellular telephone network, or combination thereof. As a further example, the network may be a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or any other type of wireless network. The network can use protocols and components for communicating via the Internet or any of the other aforementioned types of networks. For example, the protocols used by the network may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In accordance with embodiments of the present disclosure, the client device 105, the detection system 110, and the ML system 115 may cooperate to determine whether product data are consistent or inconsistent. As an example, the detection system 110 may determine whether product data for a catalog of product data is consistent in accordance with a sequence of operations.

In operation (1), the client device 105 may transmit a catalog request message to the detection system 110. In some embodiments, the catalog request message may include particular product IDs, particular marketplace IDs, particular owner IDs and the like. In some embodiments, the catalog request message may request that all product data associated with a product ID are determined to be consistent or not (e.g., across all marketplaces and owners). In some embodiments, the catalog request message may request that product data associated with a set of product IDs are determined to be consistent or not (e.g., across all marketplaces and owners for those product IDs). In some embodiments, the catalog request message may request that product data associated with a set of product IDs and a set of marketplaces are determined to be consistent or not (e.g., across all owners for those product IDs and marketplaces). In some embodiments, any subsequent comparison of single feature space vectors may be on a per-product ID basis, such that single feature space vectors may not be compared across product IDs (e.g., different product IDs) of the set. For instance, each product ID of the set of the request message may be processed in sequence or parallel as a distinct determination of whether product data is consistent for that product ID. The detection system 110 may receive the catalog request message.

In operation (2), the detection system 110 may retrieve a set of product listing datasets. In some embodiments, the detection system 110 may retrieve the set of product listing datasets in accordance with the catalog request message. For instance, the detection system 110 may retrieve the set of product listing datasets by determining product IDs and (if any) filter criteria (e.g., marketplace filter criteria, owner filter criteria, and the like) based on the catalog request message, and retrieve particular data (e.g., images or text) from the product catalog datastore 125 in accordance with the product data ID (e.g., the text, image file, or pointer). In some embodiments, depending on a resultant size of the request, the detection system 110 may perform the retrieval in batches or perform retrieve on a product ID basis.

In operation (3), the detection system 110 may generate image and text feature vectors. In some embodiments, the detection system 110 may generate the image and text feature vectors in accordance with a defined format (for image or text) from the retrieved the set of product listing datasets. For instance, the detection system 110 may generate the image and text feature vectors to a consistent size and/or format.

In operation (4), the detection system 110 may input the image and text feature vectors to the ML system 115. For instance, the detection system 110 may transmit the image and text feature vectors to, e.g., a separate component of the cloud-hosted computing system, so that the ML system 115 may receive the image and text feature vectors. The ML system 115 may receive the image and text feature vectors from the detection system 110.

In operation (5), the ML system 115 may process the image and text feature vectors through a ML model to obtain a set of single feature space vectors. For instance, the ML model may process image feature vectors through a visual kernel to obtain visual single feature space vectors for the image feature vectors and process text feature vectors through a text kernel to obtain textual single feature space vectors for the text feature vectors, as discussed herein.

The ML system 115 may transmit the set of single feature space vectors to the detection system 110. For instance, the ML system 115 may transmit the set of single feature space vectors to, e.g., a separate component of the cloud-hosted computing system, so that the detection system 110 may receive the set of single feature space vectors. Thus, in operation (6), the detection system 110 may receive the set of single feature space vectors from the ML system 115.

In operation (7), the detection system 110 may retrieve other single feature space vectors (if any) that have a same product ID as the product ID in the catalog request message (if any). For instance, the detection system 110 may retrieve other single feature space vectors (if any) for product ID from the product ID datastore 120 based on the product ID. In some embodiments, the detection system 110 may retrieve previously processed single feature space vectors for different marketplaces, to aid in the consistency determination. For instance, detection system 110 may retrieve the previously processed single feature space vectors for different marketplaces based on product ID. For instance, in this manner, previous consistency determinations may inform in-process consistency determinations for different marketplaces. In some cases, the detection system 110 may store the set of single feature space vectors in the product ID datastore 120, so that the product ID datastore 120 may be updated with single feature space vectors for the product ID and retrieved in future use cases (such as for other catalog request messages or new product listing messages).

In operation (8), the detection system 110 may compare vectors to determine whether any are inconsistent. For instance, the detection system 110 may compare single feature space vectors for the set of product listing datasets and (optionally) previously processed marketplaces (and the like) to determine whether any are inconsistent. In some embodiments, the detection system 110 may determine whether any one single feature space vector is more than a threshold difference from the other single feature space vectors, as discussed herein.

In operation (9), the detection system 110 may transmit a result message based on comparison to the client device 105. For example, the result message may indicate all product data (of the relevant product ID) are consistent, or that one or more particular data pieces (e.g., title, image (whether main or secondary), or description) are inconsistent with the product data of other product listings. In some cases, the detection system 110 may not transmit the result message. In some cases, the detection system 110 may store the result (e.g., consistent or not) in a datastore.

In this manner, the detection system 110 may detect already existing inconsistent text or image of product data. Thus, the detection system 110 may detect the inconsistency and cause an update to correct the inconsistency (e.g., update to text or image). For instance, this may reduce consumer confusion and ensure increase product ID representation consistency.

Figure 2:
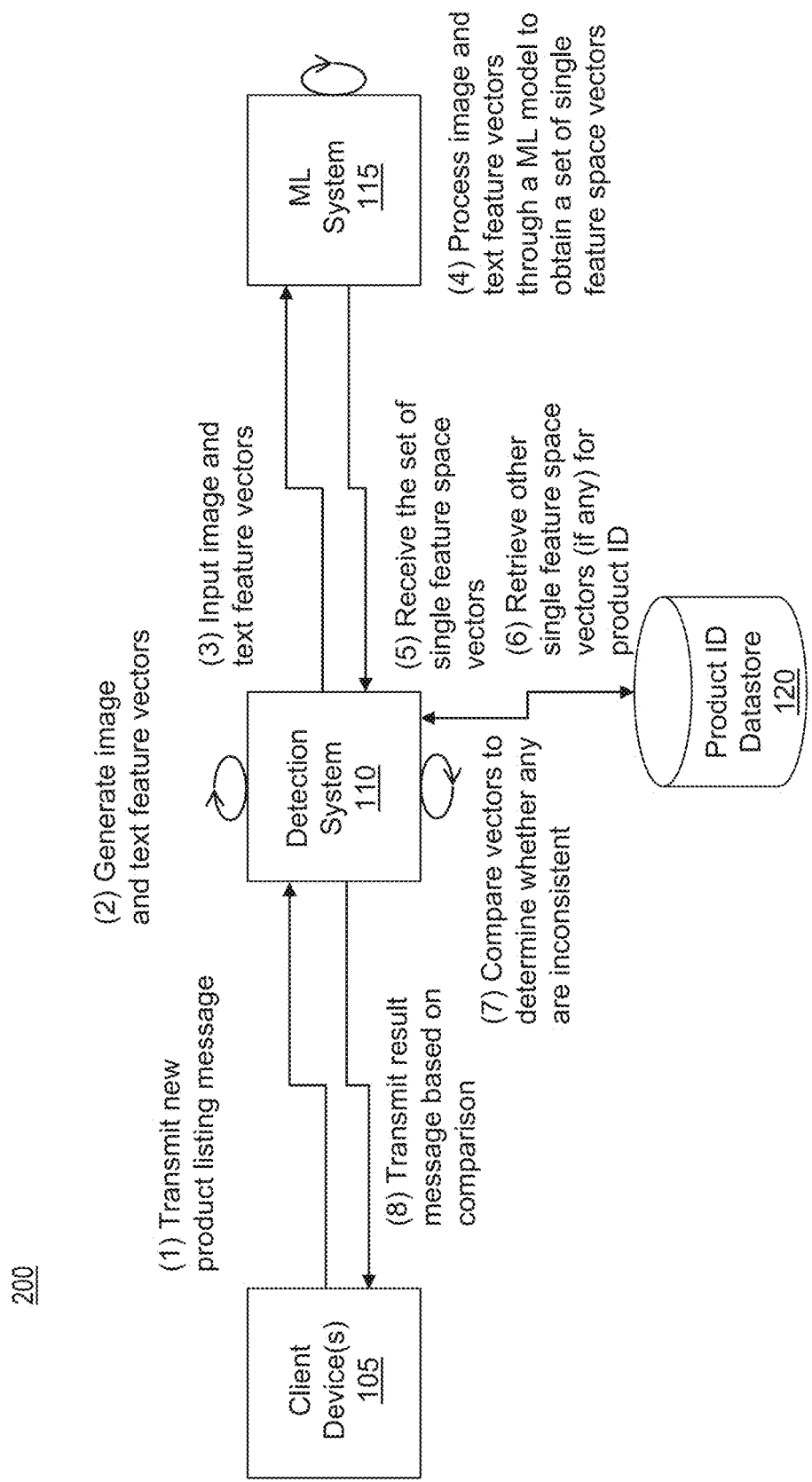
FIG. 2 is a block diagram depicting an illustrative environment in which a detection system can provide product data inconsistency detection for a new product listing to a catalog of product data.

Turning to FIG. 2, FIG. 2 is a block diagram depicting an illustrative environment 200 in which the detection system 110 can provide product data inconsistency detection for a new product listing to a catalog of product data. The environment 200 may include the client device 105, the detection system 110, the ML system 115, and the product ID datastore 120.

In accordance with embodiments of the present disclosure, the client device 105, the detection system 110, and the ML system 115 may cooperate to determine whether product data for a new product listing to a catalog of product data are consistent or inconsistent. As an example, the detection system 110 may determine whether product data for a new product listing to a catalog of product data is consistent in accordance with a sequence of operations.

In operation (1), the client device 105 may transmit a new product listing message to the detection system 110. In some embodiments, the new product listing message may include text data, image data, and a suggested product ID. In some embodiments, the new product listing message may include a request to add a product listing in association with the particular retailer (e.g., the e-commerce website or a particular third-party retailer). The suggested product ID may be an indication of an existing product ID or a request for a new product ID. The text may be title text and/or description text. The images may be main or secondary image(s) of the product. The detection system 110 may receive the new product listing message.

In operation (2), the detection system 110 may generate image and text feature vectors. For instance, the detection system 110 may extract a product ID (e.g., suggested or requested from a user of the client device 105), new image(s), and new text from the new product listing message. For instance, the detection system 110 may extract the product ID, the new image(s), and the new text from the new product listing message in accordance with a format of the new product listing message. In some embodiments, the detection system 110 may generate the image and text feature vectors from the new image(s) and new text in accordance with a defined format (for image or text). For instance, the detection system 110 may generate the image and text feature vectors to a consistent size and/or format.

In operation (3), the detection system 110 may input the image and text feature vectors to the ML system 115. For instance, the detection system 110 may transmit the image and text feature vectors to, e.g., the separate component of the cloud-hosted computing system, so that the ML system 115 may receive the image and text feature vectors. The ML system 115 may receive the image and text feature vectors from the detection system 110.

In operation (5), the ML system 115 may process the image and text feature vectors through the ML model to obtain a set of single feature space vectors. For instance, the ML model may process image feature vectors through a visual kernel to obtain visual single feature space vectors for the image feature vectors and process text feature vectors through a text kernel to obtain textual single feature space vectors for the text feature vectors, as discussed herein.

The ML system 115 may transmit the set of single feature space vectors to the detection system 110. For instance, the ML system 115 may transmit the set of single feature space vectors to, e.g., the separate component of the cloud-hosted computing system, so that the detection system 110 may receive the set of single feature space vectors. Thus, in operation (5), the detection system 110 may receive the set of single feature space vectors from the ML system 115.

In operation (6), the detection system 110 may retrieve other single feature space vectors (if any) that have a same product ID as the product ID in the new product listing message. For instance, the detection system 110 may retrieve other single feature space vectors (if any) for product ID from the product ID datastore 120 based on the product ID suggested by the new product listing message. In the case the new product listing message does not suggest a product ID (e.g., a new product ID request), the detection system 110 may determine whether some or all of the set of single feature space vectors are similar to existing vectors of existing product IDs and, if so, return the same. If not, the detection system 110 may not return any other single feature space vectors. In this manner, the request to add a new product listing may confirm consistency with existing product data based on the other single feature space vectors (if any) for a product ID. In particular, in the case a product ID is provided, the detection system 110 may compare the existing single feature space vectors against any newly generated single feature space vectors. In the case a product ID is not provided (or even if it is provided), the detection system 110 may search all existing single feature space vectors to determine whether any are similar to single feature space vectors for the new product data and, thus, the detection system 110 may check for existing product data and confirm consistency therewith.

In operation (7), the detection system 110 may compare vectors to determine whether any are inconsistent. For instance, the detection system 110 may compare single feature space vectors for the images and/or text of the new product listing and (optionally, if any) previously processed product data for the product ID (and the like) to determine whether any are inconsistent. In some embodiments, the detection system 110 may determine whether any one single feature space vector is more than a threshold difference from the other single feature space vectors, as discussed herein.

In operation (8), the detection system 110 may transmit a result message based on comparison to the client device 105. For example, the result message may indicate the product data for the new product listing are consistent with each other and with existing product data of the catalog, or that one or more particular data pieces (e.g., title, image (whether main or secondary), or description) of the new product listing are inconsistent with each other or the existing product data of other product listings.

In this manner, the detection system 110 may request an update for the new product listing before including the inconsistent data into the product catalog datastore 125. Thus, reducing consumer confusion and increasing consistency of product data across product IDs.

Figure 3:
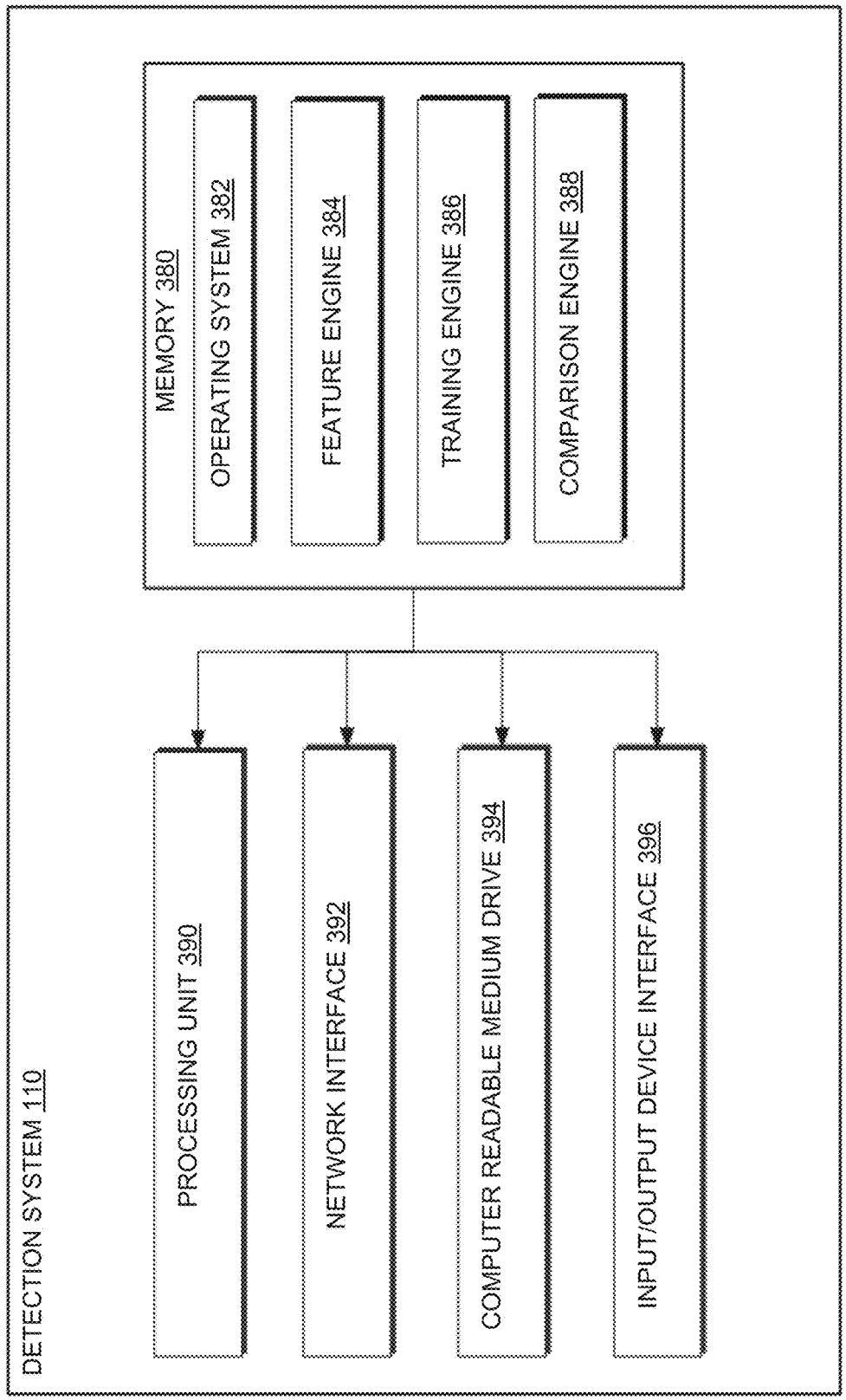
FIG. 3 depicts a general architecture of a computing device configured to implement the detection system of FIG. 1.

FIG. 3 depicts a general architecture of a computing system implementing the detection system 110 of FIG. 1. The general architecture of the system depicted in FIG. 3 includes an arrangement of computer hardware and software that may be used to implement aspects of the present disclosure. The hardware may be implemented on physical electronic devices, as discussed in greater detail below. The system may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIG. 3 (e.g., the ML system 115, etc.).

As illustrated, the system includes a processing unit 390, a network interface 392, a computer readable medium drive 394, and an input/output device interface 396, all of which may communicate with one another by way of a communication bus. The network interface 392 may provide connectivity to one or more networks or computing systems. The processing unit 390 may thus receive information and instructions from other computing systems or services via the network. The processing unit 390 may also communicate to and from memory 380 and further provide output information for an optional display (not shown) via the input/output device interface 396. The input/output device interface 396 may also accept input from an optional input device (not shown).

The memory 380 may contain computer program instructions (grouped as units in some embodiments) that the processing unit 390 executes in order to implement one or more aspects of the present disclosure, along with data used to facilitate or support such execution. While shown in FIG. 3 as a single set of memory 380, memory 380 may in practice be divided into tiers, such as primary memory and secondary memory, which tiers may include (but are not limited to) random access memory (RAM), 3D XPOINT memory, flash memory, magnetic storage, and the like. For example, primary memory may be assumed for the purposes of description to represent a main working memory of the system, with a higher speed but lower total capacity than a secondary memory, tertiary memory, etc.

The memory 380 may store an operating system 382 that provides computer program instructions for use by the processing unit 390 in the general administration and operation of the detection system 110. The memory 380 may further include computer program instructions and other information for implementing aspects of the present disclosure. For example, in one embodiment, the memory 380 includes a feature engine 384, a training engine 386, and a comparison engine 388.

The feature engine 384 may represent code executable to generate the feature vectors in accordance with the defined format (for image or text). In some embodiments, the feature engine 384 may, with respect to images, upscale or downscale, or crop the images, and the like. With respect to text, the feature engine 384 may clean text (e.g., to a standardized format, such as Unicode®), and the like.

The training engine 386 may represent code executable to train the ML model to generate single feature space vectors that are in the shared feature space, as discussed herein, from image or text feature vectors. In some embodiments, the training engine 386 may perform a triplet loss function (e.g., an anchor, positive, or negative vector). In some embodiments, the training engine 386 may perform the triplet loss function with a swap, as discussed herein.

The comparison engine 388 may represent code executable to determine whether single feature space vectors are similar or not and, based on that determination, determine whether product data corresponding to the single feature space vectors are consistent or not. In some embodiments, the comparison engine 388 may determine similarity scores between pairs of single feature space vector of set and determine a vector that has a similarity score below a threshold as not being consistent (i.e., the vector is inconsistent to the other vector), as discussed herein.

The system of FIG. 3 is one illustrative configuration of such a device, of which others are possible. For example, while shown as a single device, a system may in some embodiments be implemented as a logical device hosted by multiple physical host devices. In other embodiments, the system may be implemented as one or more virtual devices executing on a physical computing device. While described in FIG. 3 as a detection system 110, similar components may be utilized in some embodiments to implement other devices shown in the environment 100 of FIG. 3.

Figure 4:
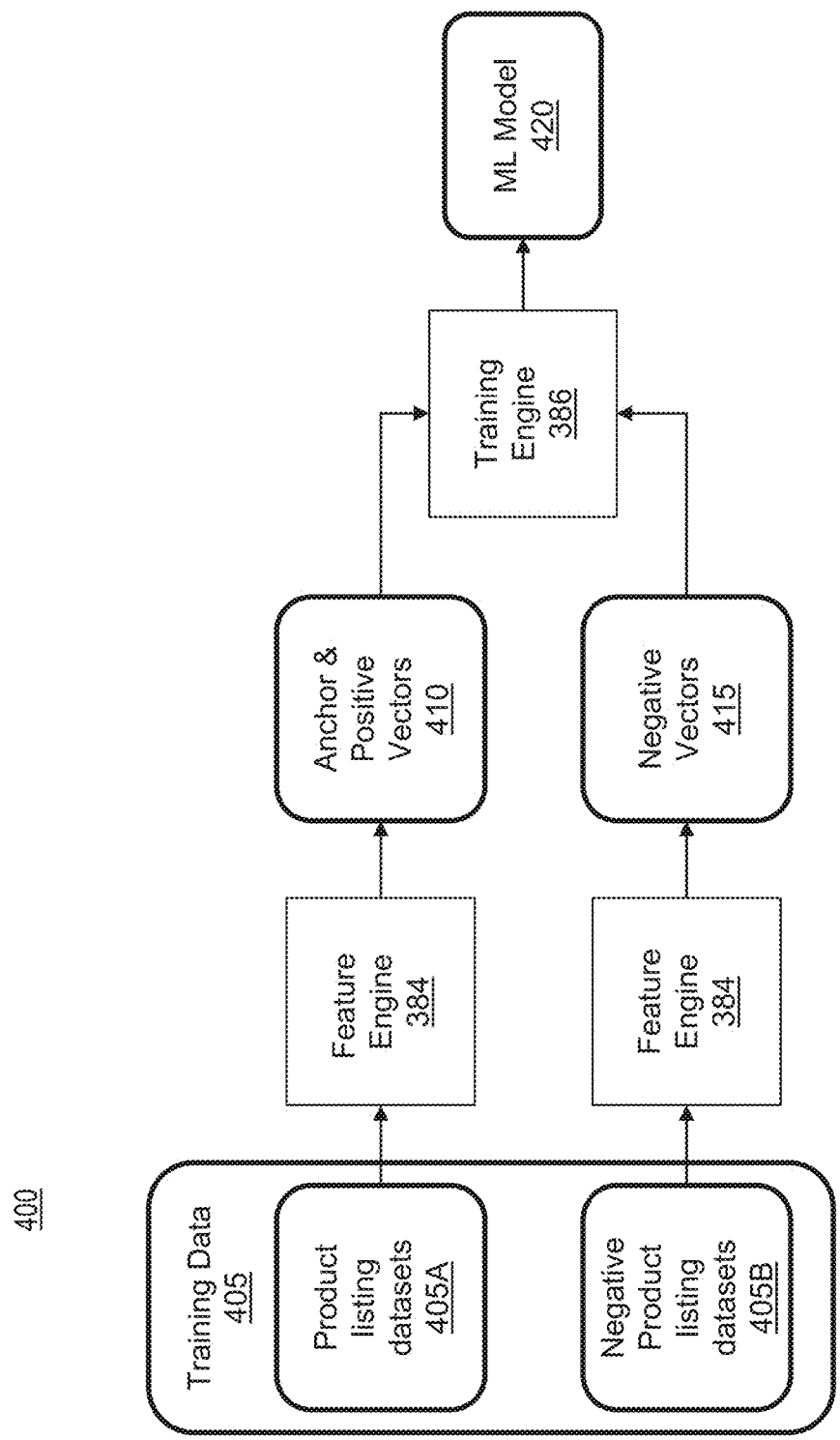
FIG. 4 is a block diagram depicting sample input to, and output from, an illustrative machine learning training engine implemented by the detection system.

FIG. 4 is a block diagram 400 depicting sample input to, and output from, an illustrative training engine 386 implemented by the detection system 110. The diagram 400 includes training data 405, the feature engine 384, and the training engine 386. The feature engine 384 may process the training data 405 to generate anchor and positive vectors 410 and negative vectors 415. The training engine 386 may process the anchor and positive vectors 410 and negative vectors 415 to generate a ML model 420.

In particular, the training data 405 may include product listing datasets 405A and negative product listing datasets 405B. The training data 405 may be stored in and retrieved from the product catalog datastore 125. The training data 405 may include a plurality of datasets that are known (e.g., confirmed by system or user input) to be consistent. For instance, a subset (e.g., thousands) of the plurality of products in the product catalog datastore 125 may be annotated by human or other system process, where the annotation indicates the product data associated with those products are consistent. Of the subset of the plurality, a portion (or all) may be allocated to training, testing, or validation in the training data 405. The product listing datasets 405A may include a first portion of the subset of the plurality of products that are consistent. Thus, the product listing datasets 405A may have datasets that are known to be consistent (e.g., images and text of each dataset represent a same product). The negative product listing datasets 405B may include a second portion of the subset of the plurality of products that are consistent, modified with an inconsistent image or text randomly sampled from the plurality of products in the product catalog. Thus, the negative product listing datasets 405B may be synthetically generated to have inconsistencies. For instance, the detection system 110 may select images and/or text from product categories that are different to a product category of each product in the negative product listing datasets 405B. As an example, while not depicted in Table 2 above, the product catalog datastore 125 may include an additional column associating each product ID with a product category ID indicative of a product category for that product. In this case, the detection system 110 may select images and/or text from a product ID that has a product category ID that is different from the product category ID of each product in the negative product listing datasets 405B, to modify (e.g., replace an image or text of) the product data of each product in the negative product listing datasets 405B.

The product listing datasets 405A and the negative product listing datasets 405B may have an equal or different number of datasets. In some embodiments, the product listing datasets 405A and/or the negative product listing datasets 405B may have datasets corresponding to products from every product category in the product catalog datastore 125. In some embodiments, the product listing datasets 405A and/or the negative product listing datasets 405B may have datasets corresponding to products from every product category in the product catalog datastore 125, in proportional amounts to their representation in the product catalog datastore 125. As an example, the product listing datasets 405A may have a first product category with a first amount that corresponds (e.g., at a same ratio) to product catalog datastore 125. In this manner, the ML model 420 may be trained for all product categories of the product catalog datastore 125, while focusing on more common product categories and not avoiding less common product categories.

In some embodiments, each dataset of the product listing datasets 405A and the negative product listing datasets 405B (as modified with the image or title from a different product category) may include one or more images and one or more text segments (e.g., alphanumeric text strings, such as titles, descriptions, and the like) for a particular product ID. In some embodiments, each dataset of the product listing datasets 405A may include an image (e.g., a main image) and a text segment (e.g., a title) for a particular product ID, and each dataset of the negative product listing datasets 405B (as modified with the image or title from a different product category) may include a text segment (e.g., a title, as randomly sampled from a different product category) for a different product ID.

The feature engine 384 may process the product listing datasets 405A to generate anchor and positive vectors 410. For instance, the feature engine 384 may generate image and text feature vectors in accordance with the defined format for each image and text of the product listing datasets 405A. In some embodiments, the feature engine 384 may assign image feature vectors as the anchor vectors of the anchor and positive vectors 410 and text feature vectors as positive vectors of the anchor and positive vectors 410. In some embodiments, the feature engine 384 may assign text feature vectors as the anchor vectors of the anchor and positive vectors 410 and image feature vectors as positive vectors of the anchor and positive vectors 410.

The feature engine 384 may process the negative product listing datasets 405B to generate negative vectors 415. For instance, the feature engine 384 may generate image and text feature vectors in accordance with the defined format for each image and text of the negative product listing datasets 405B. In some embodiments, the feature engine 384 may assign text feature vectors as the negative vectors 415. In some embodiments, the feature engine 384 may assign image feature vectors as the negative vectors 415. In some embodiments, the feature engine 384 may assign randomly sample image and text feature vectors as the negative vectors 415.

The training engine 386 may train the ML model 420 to generate single feature space vectors. As an example, the training engine 386 may be a service, such as the AMAZON SAGEMAKER® service, to train the ML model 420. In some embodiments, the training engine 386 may train the ML model 420 using the negative vectors 415 and the anchor and positive vectors 410. For instance, the training engine 386 may train the ML model 420 using metric learning. In some embodiments, the metric learning may be triplet loss metric learning. In some embodiments, the triplet loss metric learning may swap anchors and positives of the anchor and positive vectors 410 to provide unbiased learning.

Figure 5:
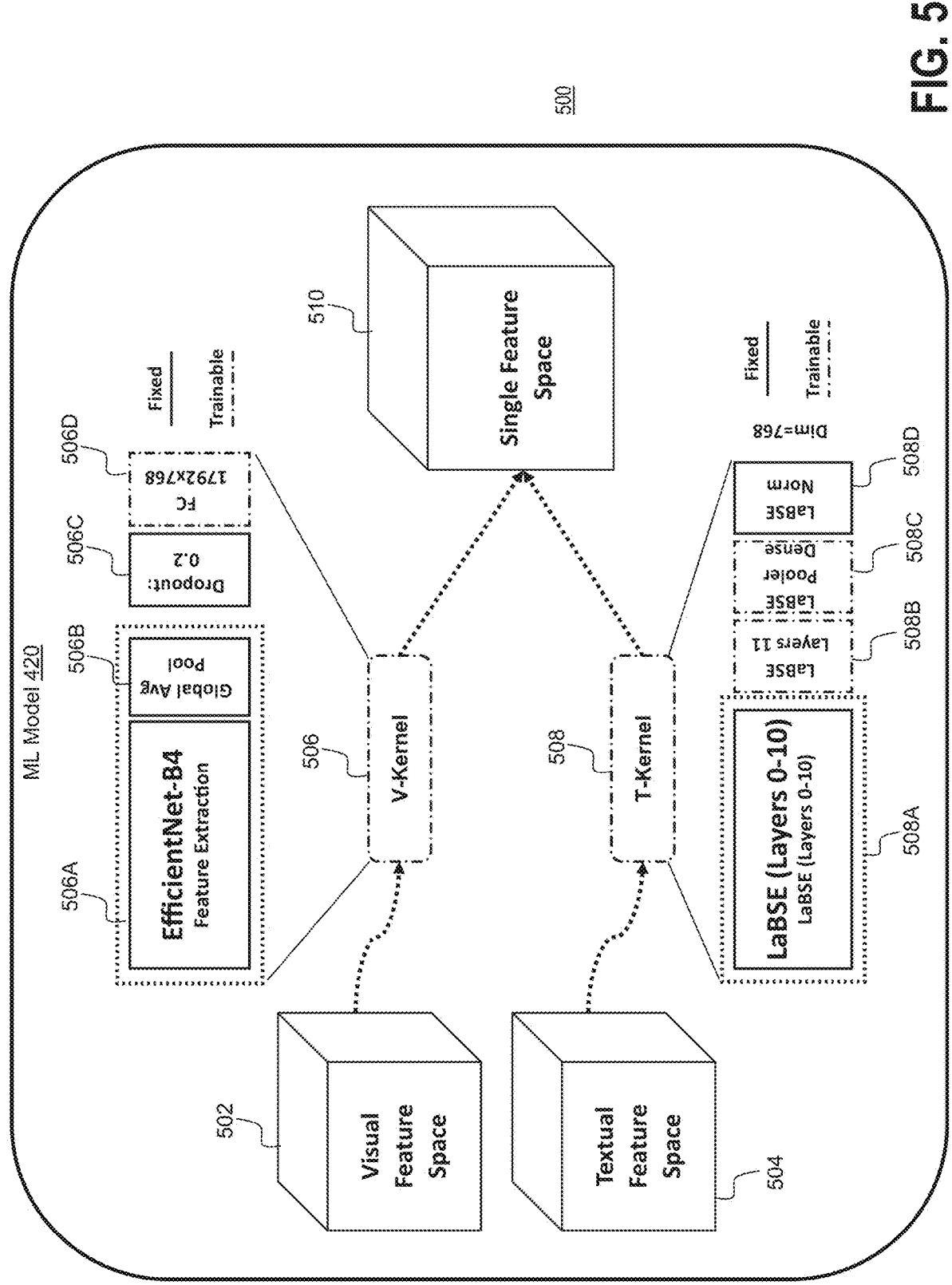
FIG. 5 is a block diagram depicting a machine learning model implemented by the detection system.

Turning to FIG. 5, FIG. 5 is a block diagram 500 depicting the ML model 420 implemented by the detection system 110. The diagram 500 depicts a visual kernel 506 and text kernel 508 of the ML model 420. The visual kernel 506 may receive as input images in a visual feature space 502 (e.g., image feature vectors) and output single feature space vectors in a single feature space 510. The text kernel 508 may receive as input text in a textual feature space 504 (e.g., text feature vectors) and output single feature space vectors in the single feature space 510.

The visual kernel 506 may be a neural network that extracts features from image feature vectors and maps the extracted features into the single feature space 510. For instance, as depicted in FIG. 5, the visual kernel 506 may have a feature extraction network 506A, a pooling layer 506B, a dropout function 506C, a trainable fully connected layer 506D, one or more other layers, or a subset thereof. The text kernel 508 may be a neural network that is multi-lingual text embedder that transforms text into 786-dimensional feature vectors. For instance, as depicted in FIG. 5, the text kernel 508 may have a sentence embedding transformer network 508A, a trainable transformer layer 508B, a trainable pooling layer 508C, a normal layer 508D, one or more other layers, or a subset thereof.

The feature extraction network 506A may be a convolutional neural network to extract features from image feature vectors into feature maps. For instance, the feature extraction network 506A may be an EfficientNet (such as EfficientNet-B4), a ResNet (such as ResNet50 Image2Vect), and the like. For instance, in the case EfficientNet-B4, the feature extraction network 506A may an output feature dimension of 1792.

The pooling layer 506B may reduce dimensions of feature maps output from the feature extraction network 506A. For instance, the pooling layer 506B may be a max pooling layer, an average pooling layer, a global pooling layer (e.g., global max pooling or global average pooling), and the like.

The dropout function 506C may randomly select individual nodes (during training) to have input units set to zero with a frequency of rate (e.g., 0.2) at each step during training time. For instance, nodes of the feature extraction network 506A, the pooling layer 506B, and/or the trainable fully connected layer 506D may be randomly selected (during training) to have input units set to zero.

The trainable fully connected layer 506D may be a fully connected linear layer. The trainable fully connected layer 506D may have dimensions that match dimensions of the normal layer 508D (e.g., 786), such that the fully connected linear layer may have a same number of neurons that match the dimensions of the normal layer 508D.

The sentence embedding transformer network 508A may be a multi-lingual text embedder. For instance, the sentence embedding transformer network 508A may be the "Language-agnostic BERT Sentence Embedding" (LaBSE) (Feng et al., 2020), which encodes text in 109 languages, to map text into 786-dimensional feature vectors. In particular, the sentence embedding transformer network 508A may be a modified version of LaBSE with 11 fixed transformer layers (0-10) from LaBSE, the trainable transformer layer 508B replacing layer 11 of LaBSE, the trainable pooling layer 508C replacing the LaBSE pooling module (with 786×786 weights connecting CLS tokens of BERT to output features), and the normal layer 508D replacing the Tanh activation function of LaBSE pooling module. The reason for using LayerNorm instead of Tanh is to give more freedom to the kernel functions to match the image and title features and have consistent feature scales in both modalities.

While certain features of the visual kernel 506 and the text kernel 508 are labeled and discussed as "trainable" and the remaining features are not labeled and discussed as "trainable," all or different features may be trained and/or tuned in different training or tuning configurations. For instance, there may be trade-offs between training all or different features of the visual kernel 506 and the text kernel 508. For instance, training/tuning the "trainable" features as discussed herein may result in faster convergence, but additional or different features may be trained or tuned and still achieve similar results.

Generally, image stimuli may be represented as $X=\{x\_1, x\_2, \ldots, x\_n\}$ and text stimuli may be represented as $Y=\{y\_1, y\_2, \ldots, y\_n\}$. In certain networks, each stimulus in X and Y may be processed by independent network architectures Netx (e.g., visual networks) and Nety (e.g., text networks), respectively, to represent xi in feature space FS_x (e.g., visual feature space 502) and y_j in feature space FS_y (e.g., textual feature space 504). However, the systems and methods of the present disclosure may provide two kernels in FS_x (e.g., visual kernel 506) and FS_y (e.g., text kernel 508) that are trained to push towards a single feature space, FS_xy. Thus, the systems and methods of the present disclosure may process data in linear time and not use fusion (neither early-fusion nor late-fusion/concatenation-classification), which would process at polynomial time (due to pair-wise processing). Moreover, the systems and methods of the present disclosure may not process image and text at the same time and together in production. In other words, product images and titles are projected to feature vectors in a single feature space where similar text and images have a maximum vector similarity (or minimum vector distance). Moreover, the systems and methods of the present disclosure may provide the ML model 420 that provides two parallel network architectures (e.g., visual kernel 506 and text kernel 508) such that each vector also represents the other modality.

In some embodiments, the training engine 386 (e.g., in FIG. 4) may train the trainable fully connected layer 506D, the trainable transformer layer 508B, the trainable pooling layer 508C of the ML model 420 using the negative vectors 415 and the anchor and positive vectors 410, while all other features may be pre-trained or preset by user design. For instance, the sentence embedding transformer network 508A and the feature extraction network 506A may be pre-trained on different datasets. In the case of negative vectors 415 from different product categories from the anchor and positive vectors 410, the negative vectors 415 may provide medium and easy negatives in contrastive learning to help the ML model 420 converge faster and easier to adapt the visual and textual kernels in the model architecture.

In particular, the training engine 386 may process the negative vectors 415 and the anchor and positive vectors 410 through the visual kernel 506 and text kernel 508 (as the case may be for images or text) to obtain single feature space vectors for each of the negative vectors 415 and the anchor and positive vectors 410. The training engine 386 may then determine feedback to update the trainable fully connected layer 506D, the trainable transformer layer 508B, the trainable pooling layer 508C based on distances between single feature space vectors for a triplet set of anchor, positive, negative selected from the negative vectors 415 and the anchor and positive vectors 410. For instance, the training engine 386 may determine the feedback from a triplet loss objective function from single feature space vectors for a triplet set of anchor, positive, negative.

In some cases, the training engine 386 may swap anchor and positive vectors for a given triplet, if a flag condition is satisfied. The flag condition may be when a distance between the positive vector and the negative vector is smaller than a distance between the anchor vector and negative vector.

After the ML model 420 has been trained, the ML model 420 may be processed (e.g., transformed from a training configuration to a deployed configuration, such as removing or deactivating the dropout function 506C). Moreover, the ML model 420 may be transmitted to the ML system 115 for use in inference.

Figure 6A:
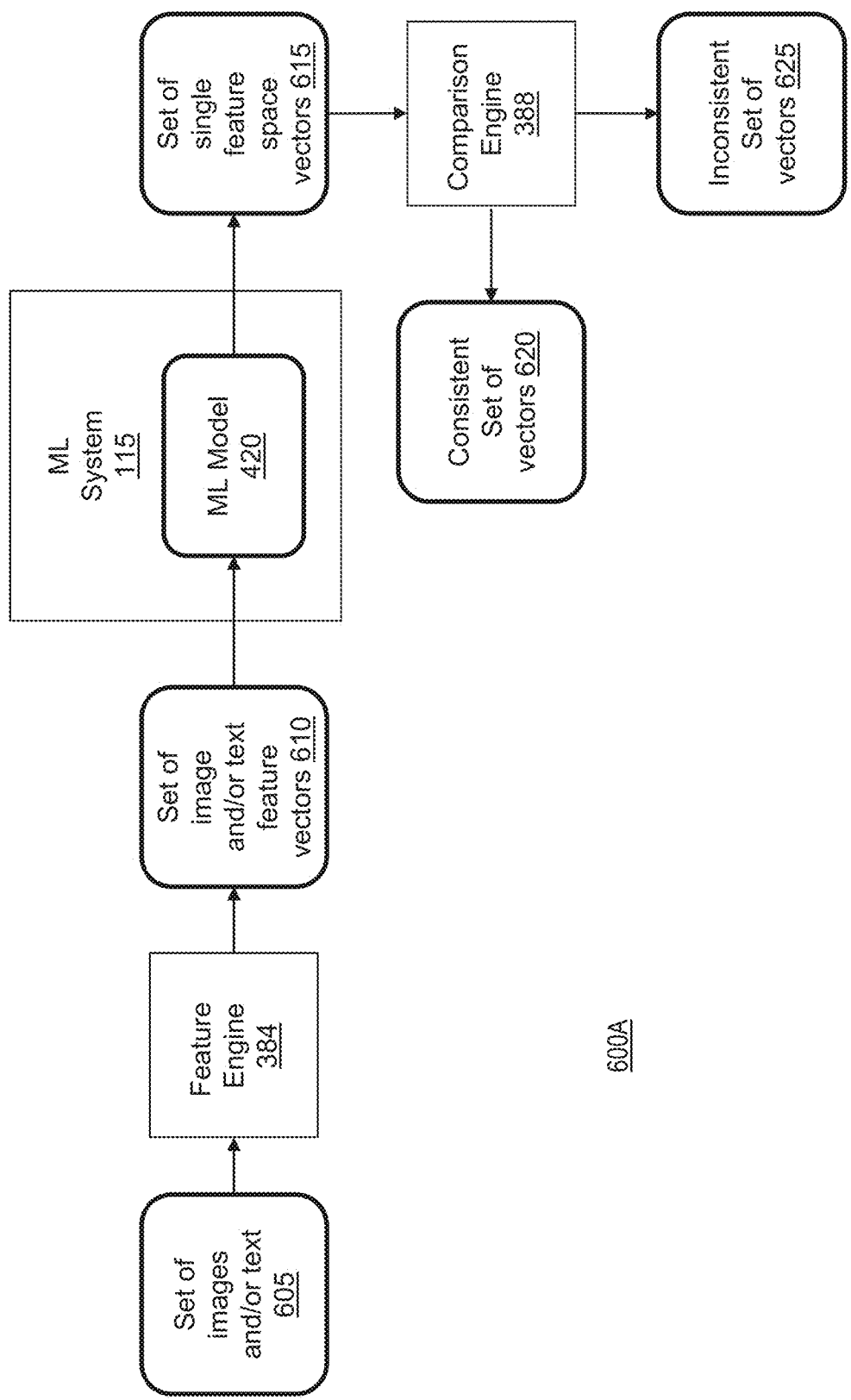
FIG. 6A is a block diagram depicting sample input to, and output from, a machine learning engine implemented by the detection system.

FIG. 6A is a block diagram 600A sample input to, and output from, the ML system 115 implemented by the detection system 110. The diagram 600A may include the feature engine 384, the ML model 420 of the ML system 115, and the comparison engine 388.

The feature engine 384 may obtain a set of images and/or text 605. For instance, the feature engine 384 may receive the set of images and/or text 605 in response to a new product listing message or a catalog request message, as discussed herein. The feature engine 384 may then process the set of images and/or text 605 to obtain a set of image and/or text feature vectors 610. For instance, the feature engine 384 may generate the set of image and/or text feature vectors 610 in accordance with the defined format (for image or text). The feature engine 384 may then input the set of image and/or text feature vectors 610 into the ML system 115.

The ML system 115 may process the set of image and/or text feature vectors 610 through the ML model 420 to obtain a set of single feature space vectors 615. For instance, the ML system 115 may process image feature vectors through the visual kernel 506 and process the text feature vectors through the text kernel 508. The ML system 115 may then input the set of single feature space vectors 615 to the comparison engine 388.

The comparison engine 388 may compare the set of single feature space vectors 615 to determine whether the set of single feature space vectors 615 are a consistent set of vectors 620 or an inconsistent set of vectors 625. For instance, in the case of two (2) single feature space vectors in the set of single feature space vectors 615 (e.g., title-image, title-title, image-image, referred to as pair of vectors), the comparison engine 388 may determine a distance metric (e.g., a cosine similarity score, Euclidian distance, Manhattan distance, Hamming distance, Minkowski distance, or the like) for the pair of vectors. For instance, the comparison engine 388 may determine the cosine similarity score by determining a dot product of the pair of vectors divided by the product of the lengths of the pair of vectors. The comparison engine 388 may then determine whether the pair of vectors are consistent or not based on a score threshold. The score threshold may be tuned by training and/or evaluation (e.g., as a statistical parameter of ML model 420 across the training data 405), or set by system design. For instance, the score threshold may indicate a particular cosine similarity score is within a given standard deviation of an average of consistent, and the like, to indicate consistent product data.

In the case of more than two (2) single feature space vectors in the set of single feature space vectors 615, the comparison engine 388 may perform a clustering or abnormality detection analysis to determine whether one or more set of single feature space vectors 615 are inconsistent with the set of single feature space vectors 615.

Figure 6B:
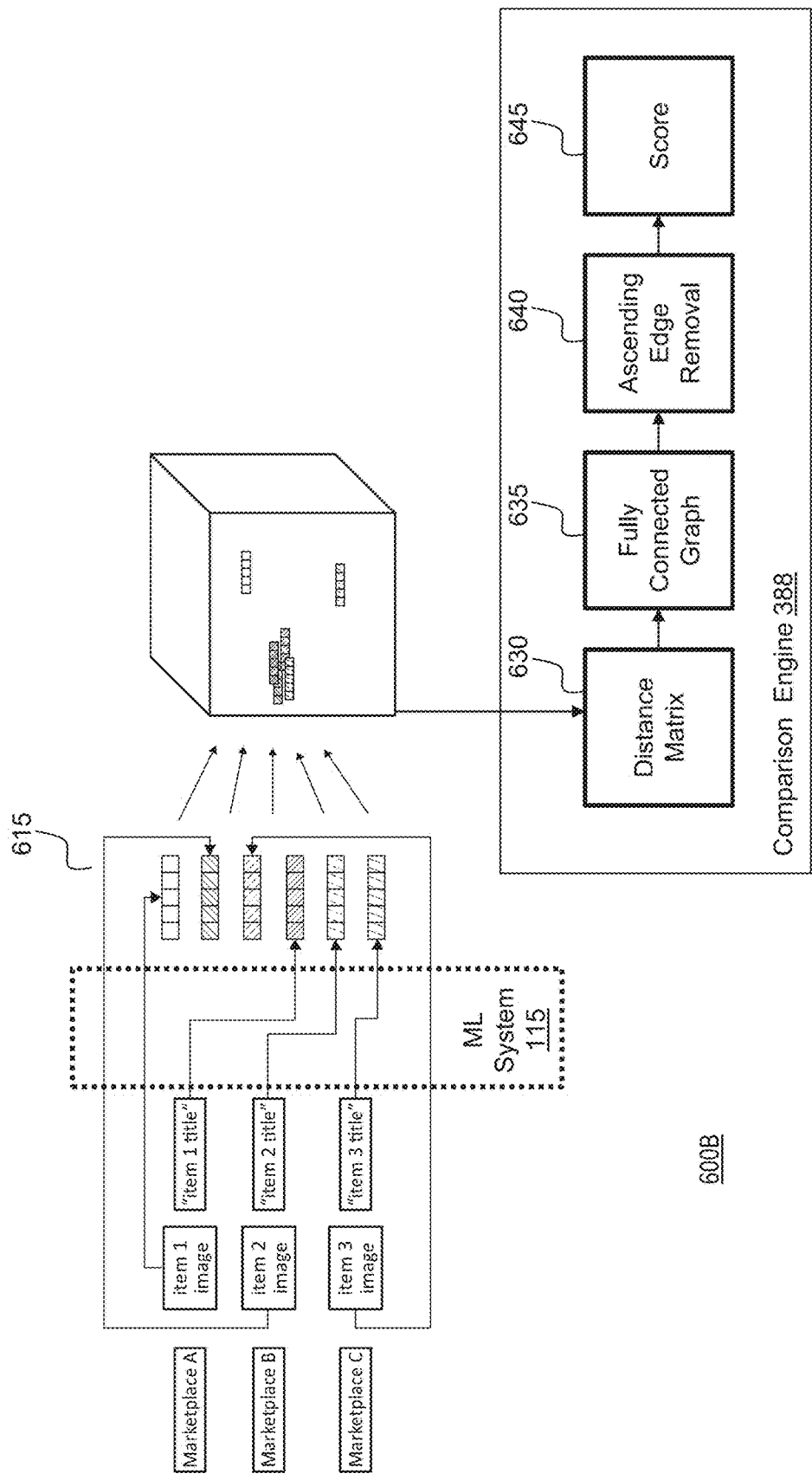
FIG. 6B is a block diagram depicting sample input to, and output from, a comparison engine implemented by the detection system.

Turning to FIG. 6B, FIG. 6B is a block diagram 600B depicting sample input to, and output from, the comparison engine 388 implemented by the detection system 110. The diagram 600B may include the set of single feature space vectors 615 output from the ML system 115 and input to the comparison engine 388. The comparison engine 388 may determine whether the set of single feature space vectors 615 are a consistent set of vectors 620 or an inconsistent set of vectors 625, based on a result of the clustering or abnormality detection analysis. For instance, the comparison engine 388, executing the clustering or abnormality detection analysis, may determine a distance matrix 630, determine a fully connected graph 635, perform ascending edge removal 640, and determine a score 645 for the set of single feature space vectors 615.

The comparison engine 388 may determine the distance matrix 630 based on the set of single feature space vectors 615. For instance, the comparison engine 388 may determine a pairwise distance metric (e.g., cosine similarity score) between respective pairs of single feature space vectors of set of single feature space vectors 615. For instance, the cosine similarity score may be determined, as discussed above. As an example, the distance matrix 630 may be a represented in a table form, such as Table 3.

TABLE 3

| Similarity | Image-US | Image-BZ | Image-MX | Title-US | Title-BZ | Title-MX |
|---|---|---|---|---|---|---|
| Image-US | 0 | 0 | 0 | 0.927 | 0.393 | 0.271 |
| Image-BZ | 0 | 0 | 0 | 0.927 | 0.393 | 0.271 |
| Image-MX | 0 | 0 | 0 | 0.927 | 0.393 | 0.271 |
| Title-US | 0.927 | 0.927 | 0.927 | 0 | 0.965 | 0.968 |
| Title-BZ | 0.393 | 0.393 | 0.393 | 0.965 | 0 | 0.281 |
| Title-MX | 0.271 | 0.271 | 0.271 | 0.968 | 0.281 | 0 |

Distance matrix 630:

In the example of Table 3, the comparison engine 388 may be comparing product data across three different marketplaces (e.g., US, BZ, and MX) with different languages (English, Portuguese, and Spanish) for a particular product (e.g., a product ID across the three marketplace IDs). In this case, the title of the product in the US marketplace is not consistent to the other product data and may be flagged as inconsistent with the product data associated with the product ID.

The comparison engine 388 may determine the fully connected graph 635 based on the distance matrix 630. For instance, the comparison engine 388 may generate a fully connected graph 635 with a number of nodes that corresponds to a number vectors in the set of single feature space vectors 615. Each node of the fully connected graph 635 may correspond to one of the set of single feature space vectors 615. The nodes may be connected by edges. The edges may correspond to pairwise distance metrics from the distance matrix 630 between each pair of vectors. For instance, each edge may be weighted by the distance metric (e.g., cosine similarity score) from the distance matrix 630 corresponding to the pairwise distance metrics for the nodes.

The comparison engine 388 may perform the ascending edge removal 640 on the fully connected graph 635. For instance, the comparison engine 388 may remove all the edges with weights less than the score threshold. In some cases, this may separate a node from the fully connected graph 635, thereby indicating the node is inconsistent with all other nodes. In this case, the comparison engine 388 may label inconsistent nodes (those that are not connected to any other node) as inconsistent nodes. Thus, the comparison engine 388 may flag product data corresponding to the inconsistent nodes for correction or removal, as discussed herein.

In some cases, the ascending edge removal 640 may break the fully connected graph 635 into separate graphs (e.g., two or more connected graphs). For instance, if two or more nodes are connected with edges that have scores that are less than the score threshold for certain to remaining nodes, but also have scores to each other above the score threshold, the fully connected graph 635 may separate into two separate connected graphs. In this case, the comparison engine 388 may flag the two or more nodes as a potential separate product ID and recommend removal from a shared product ID with the remaining nodes.

Based on a result of performing the ascending edge removal 640 on the fully connected graph 635, the comparison engine 388 may determine the score 645. The score 645 may indicate the set of single feature space vectors 615 are the consistent set of vectors 620 or the inconsistent set of vectors 625, depending on if any nodes are separated (e.g., by themselves or as a connected separate graph). For instance, if no node is separated, the score 645 may indicate the consistent set of vectors 620 and, thus, the product data is consistent. If one or more nodes are separated (but not connected together), the score 645 may indicate the inconsistent set of vectors 625 and, thus, trigger correction or removal for product data of relevant product listings. If one or more nodes are separated (and connected together), the score 645 may indicate the inconsistent set of vectors 625 and, thus, trigger correction for a product ID. For instance, the score 645 may be lowest score of any separated node (if any); otherwise, the score 645 may be a consistency flag (e.g., 1 for consistent).

Figure 7:
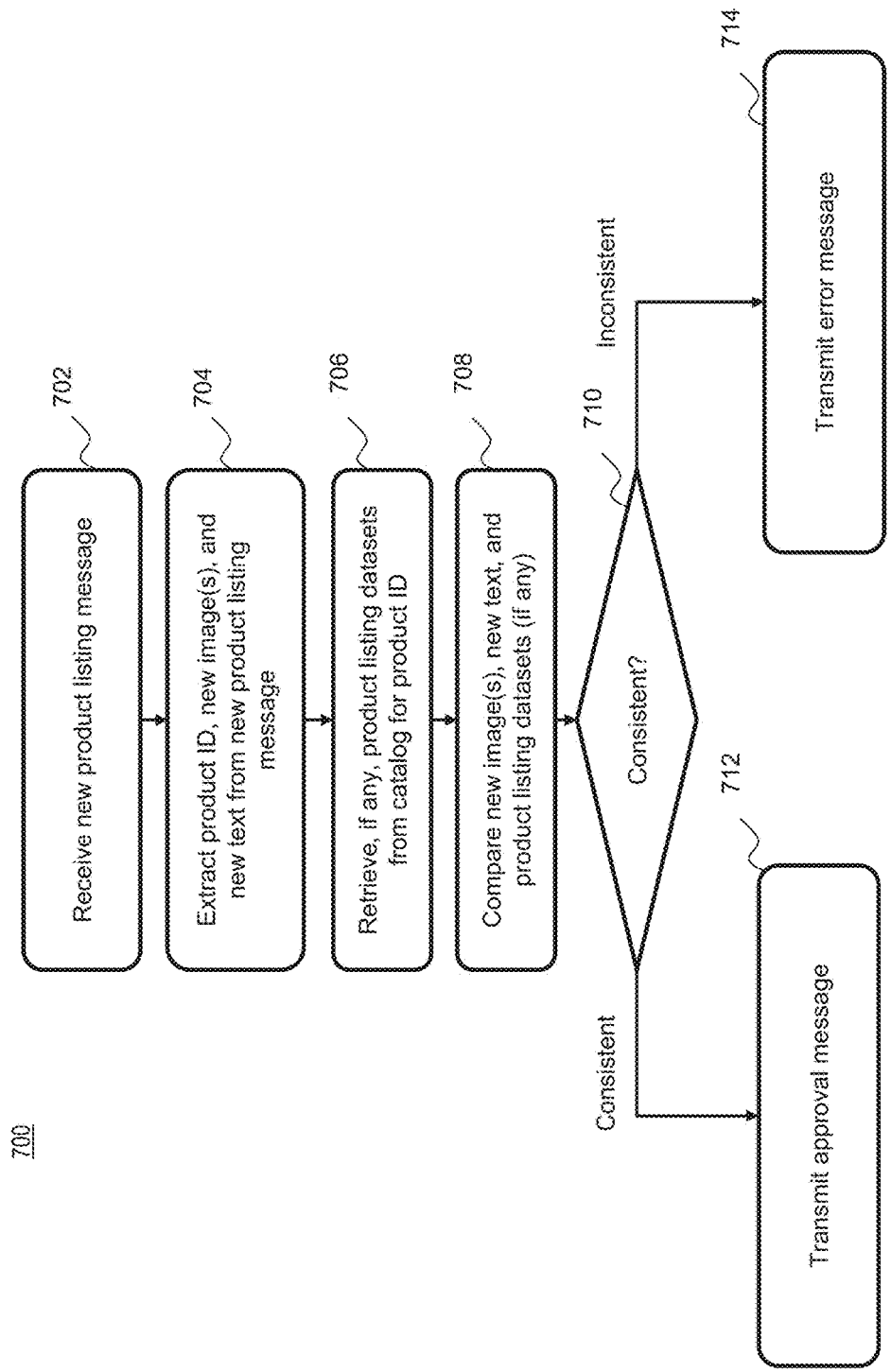
FIG. 7 is a flow chart depicting an illustrative routine implemented by the detection system for providing product data inconsistency detection.

With reference to FIG. 7, an illustrative routine 700 for product data inconsistency detection, will be described. The routine 700 may be implemented, for example, by the detection system 110 of FIG. 1. In at least one embodiment, the detection system 110 and the ML system 115 may implement all or portions of the routine 700.

The routine 700 begins at block 702, where the detection system 110 may receive a new product listing message. For example, as discussed herein, the detection system 110 may a receive new product listing message from a client device 105 for a new product listing to the product catalog datastore 125, so as to be listed as a new product listing.

At block 704, the detection system 110 may extract product ID, new image(s), and new text from the new product listing message. For example, the detection system 110 may extract product ID, new image(s), and new text from the new product listing message, as discussed herein.

At block 706, the detection system 110 may retrieve, if any, product listing datasets from the catalog for a product ID. For example, the detection system 110 may retrieve product datasets in accordance with the product ID from the product catalog datastore 125 based on the product ID. For instance, the detection system 110 may retrieve image(s) and/or text of existing product data based on the product ID from the product catalog datastore 125.

At block 708, the detection system 110 may compare new image(s), new text, and product listing datasets (if any). For example, the detection system 110 may compare new image(s) and new text to each other to determine whether the image and text or image and image (of image(s)) are consistent with each other, and compare both the new image(s) and new text to the product listing datasets (if any), as discussed herein.

At block 710, the detection system 110 may determine whether the new image(s), new text, and product listing datasets (if any) are consistent. For example, the detection system 110 may determine image-image, image-text, text-text, or larger sets of product data are consistent, as discussed herein, based on single feature space vectors for the product data.

At block 712, in response to determining the new image(s), new text, and product listing datasets (if any) are consistent, the detection system 110 may transmit an approval message. For example, the detection system 110 may indicate a new product listing may proceed.

At block 714, in response to determining the new image(s), new text, and product listing datasets (if any) are not consistent, the detection system 110 may transmit an error message. For example, the detection system 110 may transmit an user interface informing a user as to a nature of the issue, as discussed herein.

FIGS. 8A-8E are block diagrams 800A-800E depicting user interfaces based on product data inconsistency detection for a new product listing to a catalog of products. For each of the diagrams 800A-800E, the client device 105, at (1), transmits a new product listing message, which may be received by the detection system 110. The detection system 110, at (2), compares new image(s), new text, and product listing datasets (if any). The detection system 110, at (3), then transmits a result message based on comparison.

Figure 8A:
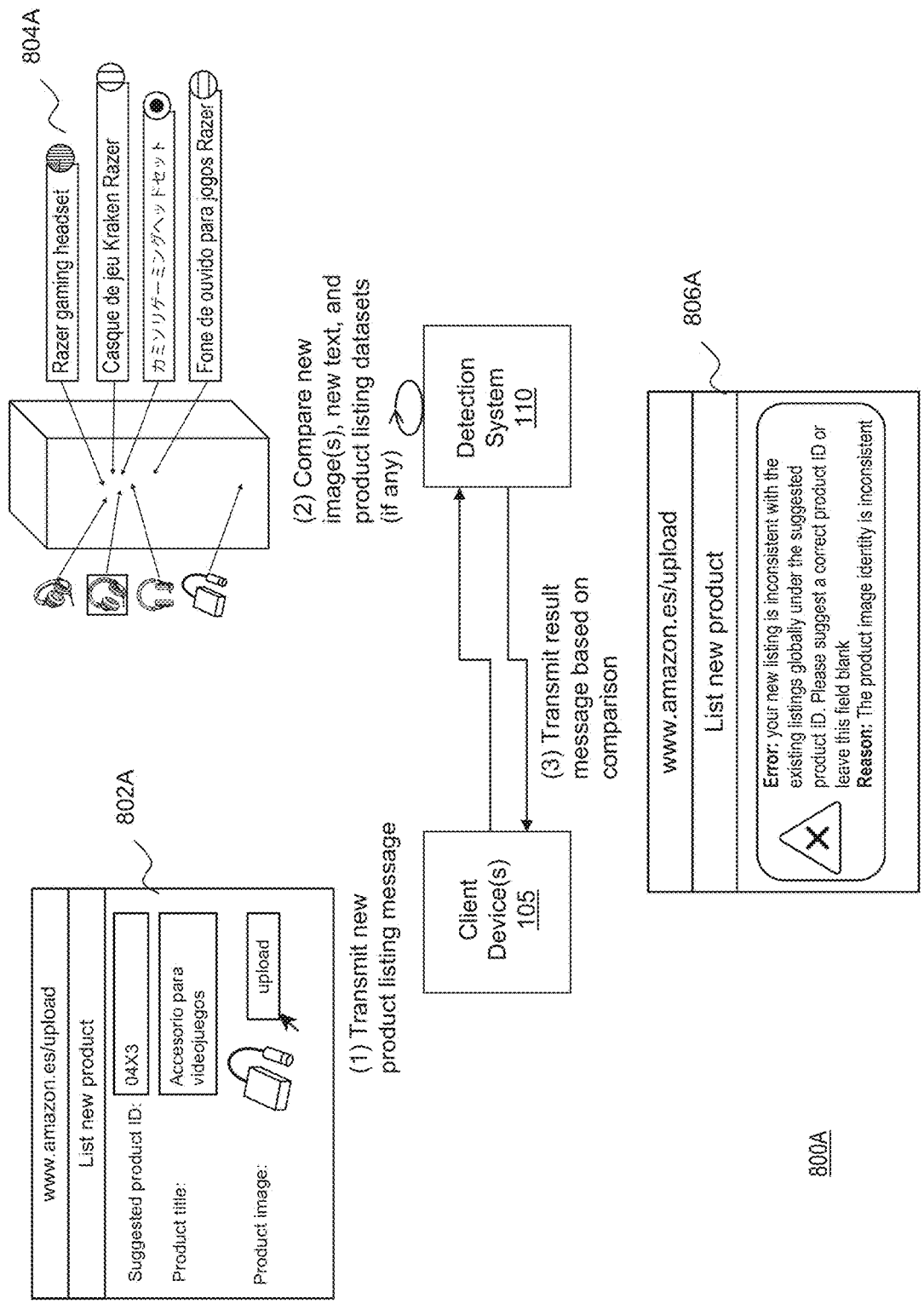
FIGS. 8A, 8B, 8C, 8D, and 8E are block diagrams depicting user interfaces based on product data inconsistency detection for a new product listing to a catalog of products.

In the case depicted in FIG. 8A, diagram 800A depicts input data 802A that is transmitted as a part of the new product listing message. The input data 802A may include a suggested product ID, a product title (e.g., new text) and one or more product image(s) (e.g., new image(s)). The input data 802A may be input by a user to the client device 105 Based on a suggested product ID of the input data 802A, the detection system 110 may retrieve product listing datasets (if any) from the product ID datastore 120. The detection system 110 may then compare the new image(s), the new text, and the retrieved product listing datasets (if any) to determine whether the new image(s) and/or the new text are consistent with each other or consistent with the retrieved product listing datasets (if any). For instance, the detection system 110 may determine whether single feature space vectors for the new image(s) and/or the new text are within a similarity threshold of each other or within a similarity threshold of single feature space vectors for the retrieved product listing datasets (if any). As an example in FIG. 8A, mapped vectors 804A may represent the single feature space vectors for the new image(s), the new text, and the retrieved product listing datasets. In this case, the detection system 110 may determine that a new image is inconsistent with retrieved product listing datasets. The result message may then indicate new image is inconsistent with retrieved product listing datasets. The client device 105 may then display an error message 806A that explains new image is inconsistent with retrieved product listing datasets, and recommend a new product ID be entered or left blank.

Figure 8B:
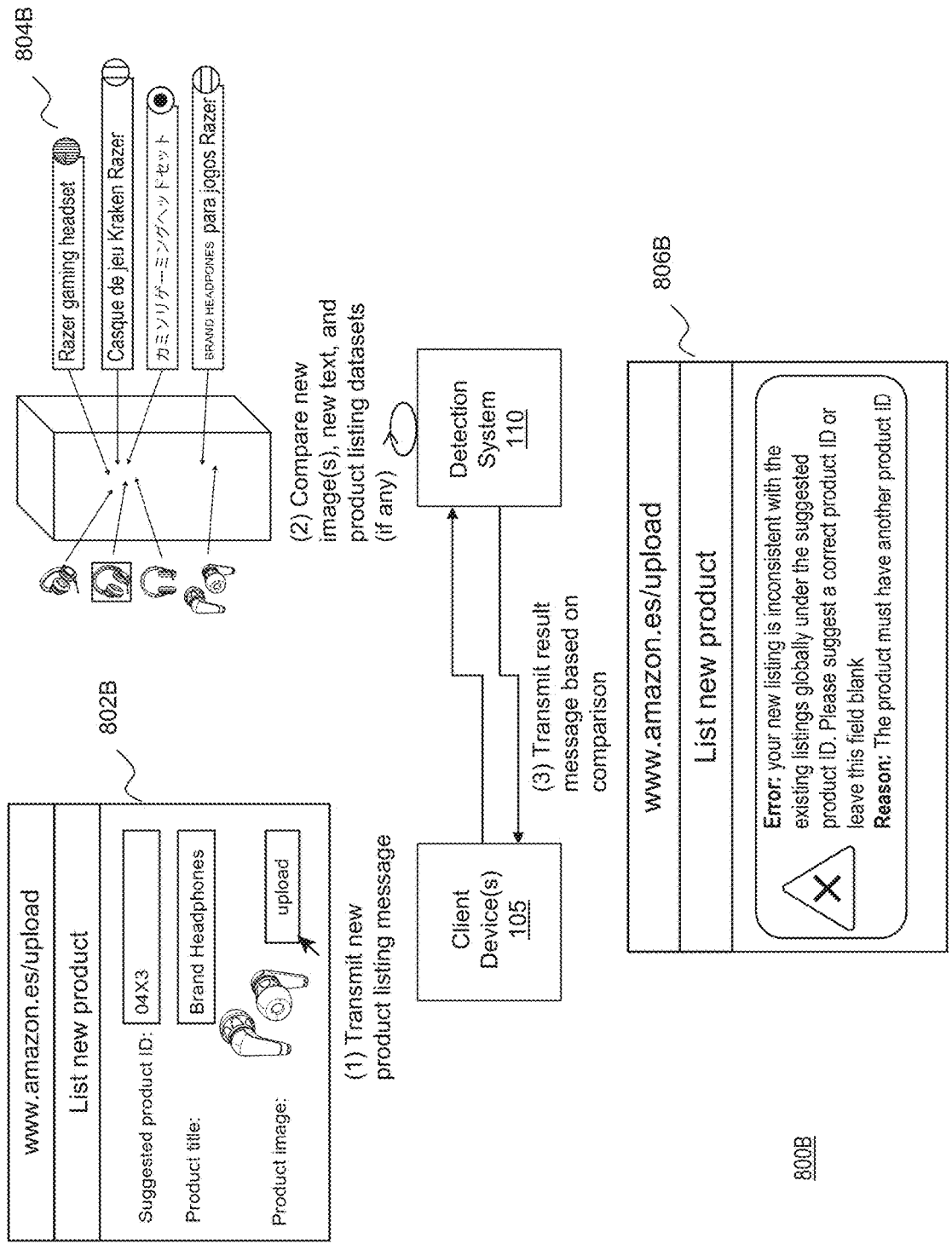

In the case depicted in FIG. 8B, diagram 800B depicts input data 802B that is transmitted as a part of the new product listing message. The input data 802B may include a suggested product ID, a product title (e.g., new text) and one or more product image(s) (e.g., new image(s)). The input data 802B may be input by a user to the client device 105 Based on a suggested product ID of the input data 802B, the detection system 110 may retrieve product listing datasets (if any) from the product ID datastore 120. The detection system 110 may then compare the new image(s), the new text, and the retrieved product listing datasets (if any) to determine whether the new image(s) and/or the new text are consistent with each other or consistent with the retrieved product listing datasets (if any). For instance, the detection system 110 may determine whether single feature space vectors for the new image(s) and/or the new text are within a similarity threshold of each other or within a similarity threshold of single feature space vectors for the retrieved product listing datasets (if any). As an example in FIG. 8B, mapped vectors 804B may represent the single feature space vectors for the new image(s), the new text, and the retrieved product listing datasets. In this case, the detection system 110 may determine that a new image and new text are inconsistent with retrieved product listing datasets (as retrieved by the suggested product ID). The result message 806B may then indicate new image and new text are inconsistent with retrieved product listing datasets, and recommend a new product ID be entered or left blank.

Figure 8C:
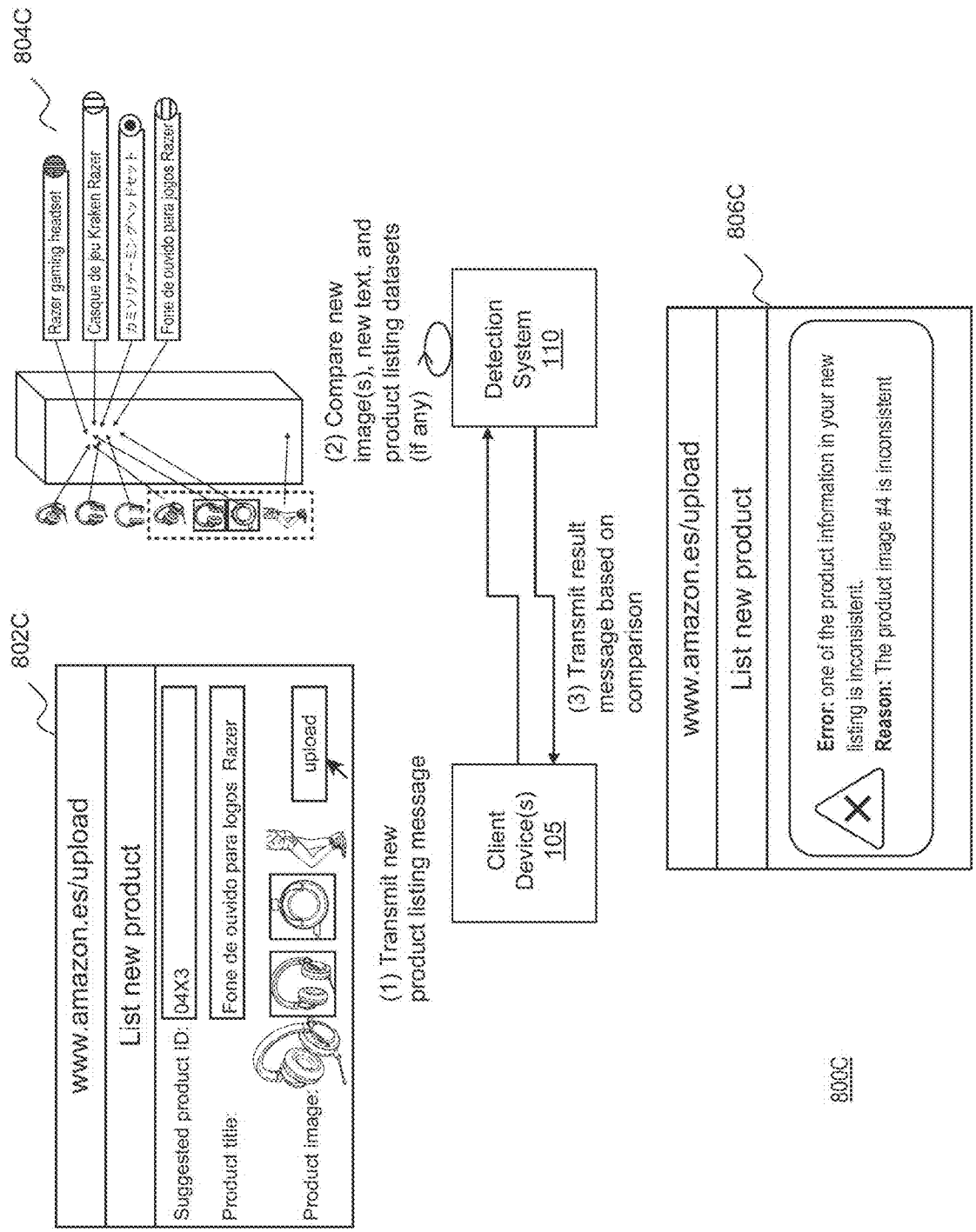

In the case depicted in FIG. 8C, diagram 800C depicts input data 802C that is transmitted as a part of the new product listing message. The input data 802C may include a suggested product ID, a product title (e.g., new text) and one or more product image(s) (e.g., new image(s)). The input data 802C may be input by a user to the client device 105 Based on a suggested product ID of the input data 802C, the detection system 110 may retrieve product listing datasets (if any) from the product ID datastore 120. The detection system 110 may then compare the new image(s), the new text, and the retrieved product listing datasets (if any) to determine whether the new image(s) and/or the new text are consistent with each other or consistent with the retrieved product listing datasets (if any). For instance, the detection system 110 may determine whether single feature space vectors for the new image(s) and/or the new text are within a similarity threshold of each other or within a similarity threshold of single feature space vectors for the retrieved product listing datasets (if any). As an example in FIG. 8C, mapped vectors 804C may represent the single feature space vectors for the new image(s), the new text, and retrieved product listing datasets. In this case, the detection system 110 may determine that a new image is inconsistent with one or more new images. The result message may then indicate the new image is inconsistent with the one or more new images. The client device 105 may then display an error message 806C that explains new image is inconsistent with the one or more new images.

Figure 8D:
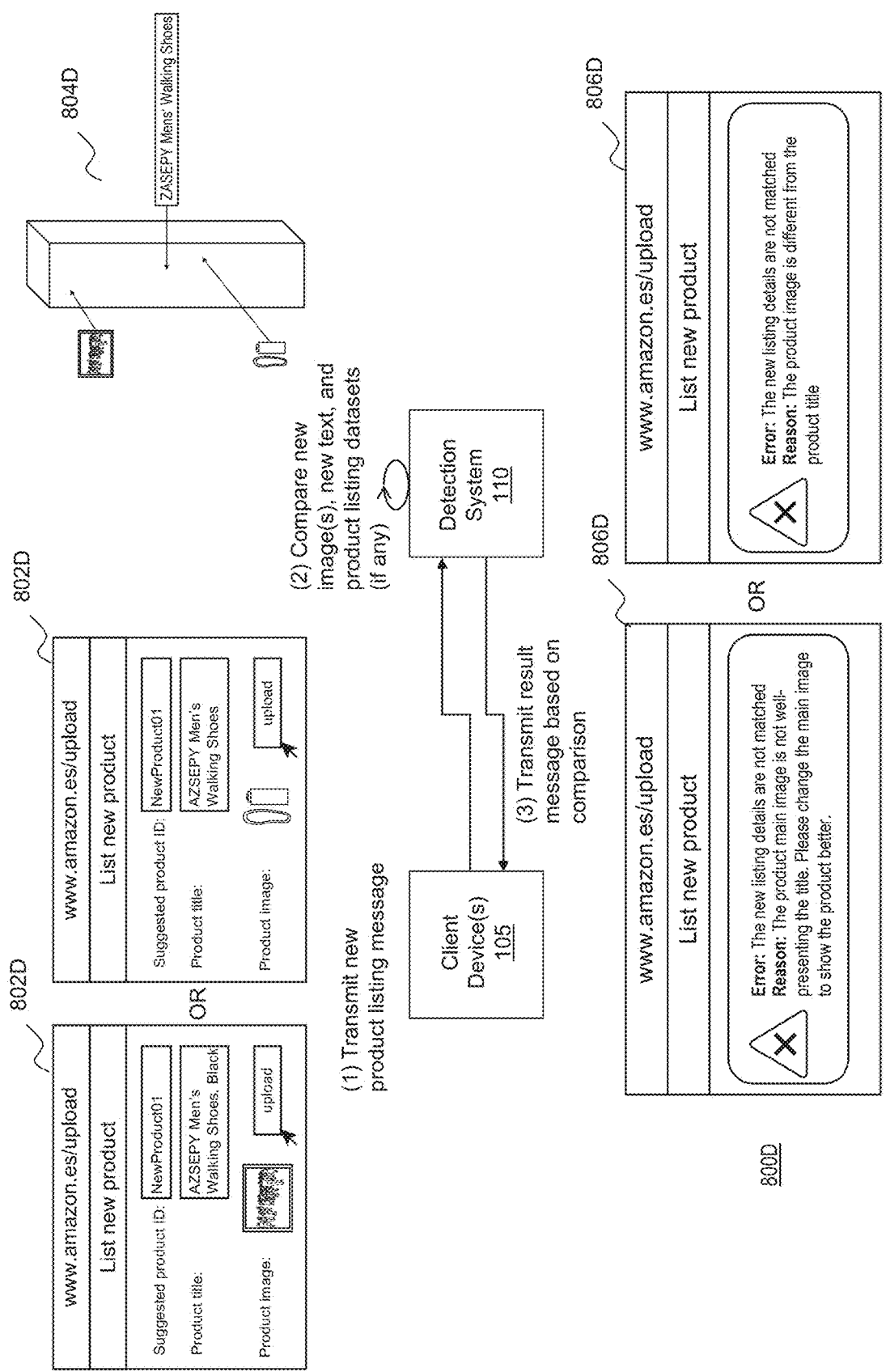

In the case depicted in FIG. 8D, diagram 800D depicts input data 802D that is transmitted as a part of the new product listing message. The input data 802D may include a request for a new product ID, a product title (e.g., new text) and one or more product image(s) (e.g., new image(s)). The input data 802D may be input by a user to the client device 105 Based on a suggested product ID of the input data 802D, the detection system 110 may retrieve product listing datasets (if any) from the product ID datastore 120. The detection system 110 may then compare the new image(s), the new text, and the retrieved product listing datasets (if any) to determine whether the new image(s) and/or the new text are consistent with each other or consistent with the retrieved product listing datasets (if any). For instance, the detection system 110 may determine whether single feature space vectors for the new image(s) and/or the new text are within a similarity threshold of each other or within a similarity threshold of single feature space vectors for the retrieved product listing datasets (if any). As an example in FIG. 8D, mapped vectors 804D may represent the single feature space vectors for the new image(s), the new text, and retrieved product listing datasets. In this case, the detection system 110 may determine that new image and new title are inconsistent with each other. The result message may then indicate that the new image and new title are inconsistent with each other. The client device 105 may then display an error message 806D that explains that the new image and new title are inconsistent with each other.

Figure 8E:
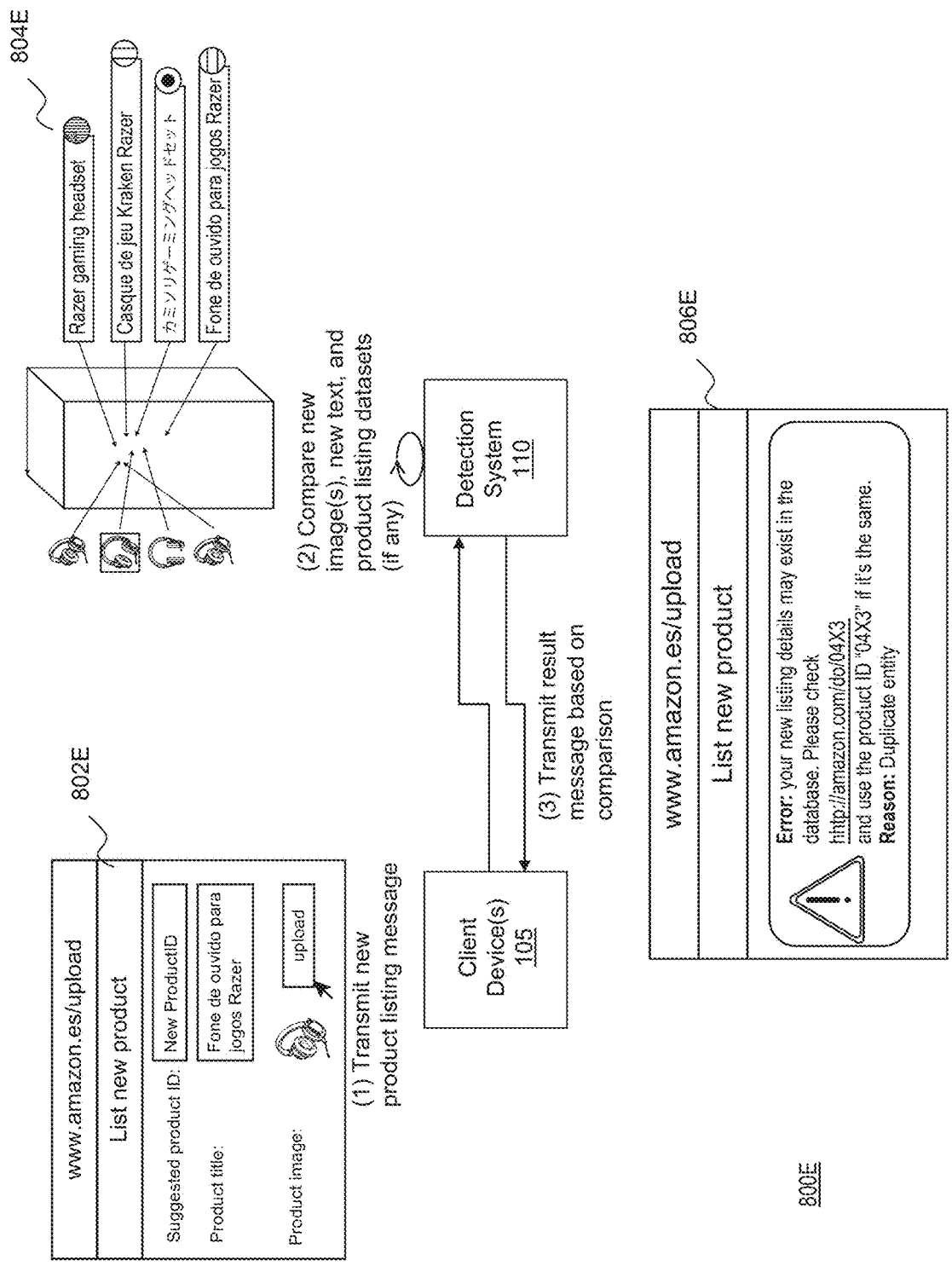

In the case depicted in FIG. 8E, diagram 800E depicts input data 802E that is transmitted as a part of the new product listing message. The input data 802E may include a request for a new product ID, a product title (e.g., new text) and one or more product image(s) (e.g., new image(s)). The input data 802E may be input by a user to the client device 105. Based on a request for new product ID, the detection system 110 may retrieve product listing datasets (if any) from the product ID datastore 120 that are similar to single feature space vectors of the new image(s) and/or new text. The detection system 110 may then compare the new image(s), the new text, and the retrieved product listing datasets (if any) to determine whether the new image(s) and/or the new text are consistent with each other or consistent with the retrieved product listing datasets (if any). For instance, the detection system 110 may determine whether single feature space vectors for the new image(s) and/or the new text are within a similarity threshold of each other or within a similarity threshold of single feature space vectors for the retrieved product listing datasets (if any). As an example in FIG. 8E, mapped vectors 804E may represent the single feature space vectors for the new image(s), the new text, and retrieved product listing datasets. In this case, the detection system 110 may determine that new image(s) and the new text are consistent with an existing product ID. The result message may then indicate new image(s) and the new text are consistent with an existing product ID. The client device 105 may then display an error message 806E that explains the new image(s) and the new text are consistent with an existing product ID, and recommend the existing product ID to the user.

In some cases, the detection system 110 may retrieve product listing datasets (if any) from the product ID datastore 120 that are more than the score threshold to single feature space vectors of the new image(s) and/or new text by performing one or combinations of: subsetting (e.g., searching ranges within the singe feature space for other vectors that are also within the same range), local sensitivity hashing, clustering vectors, and/or nearest neighbor search.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a memory configured to store specific computer-executable instructions; and
a processor in communication with the memory and configured to execute the specific computer-executable instructions to at least:
receive a new product listing message from a client device, wherein the new product listing message includes a request that elements of new product data associated with a product identification be evaluated for consistency with other elements of the new product data or that the new product data be evaluated for consistency with existing product data, and wherein the new product data includes at least one new image and at least one new text segment;
retrieve a set of product listing datasets based on the product identification, wherein the product listing datasets include one or more product listings, and wherein each product listing includes at least one image or at least one text segment;
generate a plurality of modality-agnostic feature space vectors from the at least one new image and the at least one new text segment using a machine learning model comprising:
an imagery component configured to generate modality-agnostic feature space vectors in a single feature space from input in an image modality; and
a textual component configured to generate modality-agnostic feature space vectors in the single feature space from input in a text modality;
compare individual modality-agnostic feature space vectors of the plurality of modality-agnostic feature space vectors with at least one modality-agnostic feature space vector generated from the at least one image or the at least one text segment to determine whether any are inconsistent; and
prevent presentation, on a product listing platform, of the new product data based on determining that the at least one new image or the at least one new text segment is inconsistent.

2. The system of claim 1, wherein the machine learning model is a language-agnostic and modality-agnostic neural network.

3. The system of claim 1, wherein the imagery component and the textual component extract textual and visual features without pairing modalities.

4. The system of claim 1, wherein the textual component is a neural network that is multi-lingual text embedder.

5. The system of claim 1, wherein the imagery component is a neural network that extracts features from image feature vectors and maps the extracted features into the single feature space.

6. The system of claim 1, wherein the machine learning model is trained using training data that includes anchor feature vectors, positive feature vectors, and synthetic negative feature vectors, wherein the anchor feature vectors include a first one of images or text and the positive feature vectors include a second one of images or text.

7. The system of claim 1, wherein to determine whether an image or segment of text is inconsistent, the processor is further programmed by the specific computer-executable instructions to:
determine a distance matrix, wherein the distance matrix includes each distance metric for each pair of single feature space vectors of a set of single feature space vectors;
determine a connected graph of nodes based on the distance matrix, wherein the nodes are connected by edges weighted by respective distance metrics; and
perform an ascending edge removal on the connected graph, wherein performing the ascending edge removal on the connected graph removes an edge when the edge has a weight less than a score threshold, wherein the edge corresponds to a distance metric for the pair of single feature space vectors, and wherein one of the pair of single feature space vectors correspond to the image or text.

8. The system of claim 7, wherein to generate the single feature space vectors, the processor is further programmed by the specific computer-executable instructions to extract visual features or text features without embedding or concatenating the visual features with textual features.

9. A computer-implemented method:
under control of a computing system comprising one or more computer processors configured to execute specific instructions:
receiving a new product listing message from a client device, wherein the new product listing message includes a request that elements of new product data associated with a product identification be evaluated for consistency with other elements of the new product data or that the new product data be evaluated for consistency with existing product data, and wherein the new product data includes at least one new image and at least one new text segment;
retrieving a set of product listing datasets based on the product identification, wherein the product listing datasets include one or more product listings, and wherein each product listing includes at least one image or at least one text segment;
comparing the at least one new image and the at least one new text segment with the at least one image or the at least one text segment to determine whether any are inconsistent, wherein determining whether an image or segment of text is inconsistent comprises:
determining a distance matrix, wherein the distance matrix includes each distance metric for each pair of single feature space vectors of a set of single feature space vectors;
determining a connected graph of nodes based on the distance matrix, wherein the nodes are connected by edges weighted by respective distance metrics; and
performing an ascending edge removal on the connected graph, wherein performing the ascending edge removal on the connected graph removes an edge when the edge has a weight less than a score threshold, wherein the edge corresponds to a distance metric for the pair of single feature space vectors, and wherein one of the pair of single feature space vectors correspond to the image or text; and
transmitting a result message to the client device, wherein the result message indicates the at least one new image or the at least one new text segment is inconsistent.

10. The computer-implemented method of claim 9, wherein comparing the at least one new image, the at least one new text segment, the at least one image, and the at least one text segment includes:

generating image and text feature vectors from the at least one new image and at least one new text segment and the at least one image or at least one text segment;
inputting the image and text feature vectors to a machine learning model, wherein the machine learning model generates a set of single feature space vectors from the image and text feature vectors;
receiving the set of single feature space vectors from the machine learning model; and
comparing the set of single feature space vectors to determine whether any are inconsistent, wherein comparing the set of single feature space vectors includes determining a distance metric for each possible pairing of single feature space vectors of the set of single feature space vectors, determining a particular distance metric for a particular pair of single feature space vectors is less than a score threshold, and determining the at least one new image or the at least one new text segment correspond to the particular distance metric and the at least one new image or the at least one new text segment is inconsistent.

11. The computer-implemented method of claim 10, wherein the machine learning model is a language-agnostic and modality-agnostic neural network.

12. The computer-implemented method of claim 10, wherein the machine learning model includes kernels configured to extract textual and visual features of the image and text feature vectors.

13. The computer-implemented method of claim 12, wherein the kernels extract the textual and visual features without pairing modalities.

14. The computer-implemented method of claim 12, wherein the kernels include a text kernel, and wherein the text kernel is a neural network that is multi-lingual text embedder.

15. The computer-implemented method of claim 12, wherein the kernels include a visual kernel, and wherein the visual kernel is a neural network that extracts features from image feature vectors and maps the extracted features into a single feature space.

16. The computer-implemented method of claim 10, wherein the machine learning model is trained using training data that includes anchor feature vectors, positive feature vectors, and synthetic negative feature vectors, wherein the anchor feature vectors include a first one of images or text and the positive feature vectors include a second one of images or text.

17. The computer-implemented method of claim 9, wherein generating the single feature space vectors comprises extracting visual features or text features without embedding or concatenating the visual features with textual features.

* * * * *